US006584666B1

(12) United States Patent
Savicki

(10) Patent No.: US 6,584,666 B1
(45) Date of Patent: Jul. 1, 2003

(54) METHOD AND APPARATUS FOR ASSEMBLING SLIDER MEMBERS ONTO INTERLOCKING FASTENING STRIPS USING A RAIL

(75) Inventor: Alan F. Savicki, Oswego, IL (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 09/979,520

(22) PCT Filed: Jun. 10, 1999

(86) PCT No.: PCT/US99/13259

§ 371 (c)(1),
(2), (4) Date: Nov. 19, 2001

(87) PCT Pub. No.: WO00/76755

PCT Pub. Date: Dec. 21, 2000

(51) Int. Cl.[7] .......................... B29D 5/00; A41H 37/06
(52) U.S. Cl. .......................... 29/408; 29/768; 383/64
(58) Field of Search .......................... 29/766, 768, 408, 29/409; 24/399, 400, 430; 383/64, 69; 493/213, 214

(56) References Cited

U.S. PATENT DOCUMENTS 3,266,135 A 8/1966 Morin
3,790,992 A 2/1974 Herz
4,809,414 A 3/1989 Sawada
5,283,932 A 2/1994 Richardson et al.
6,199,256 B1 * 3/2001 Revnew .......................... 29/408

* cited by examiner

*Primary Examiner*—P. W. Echols
(74) *Attorney, Agent, or Firm*—Thomas C. Feix

(57) ABSTRACT

Several embodiments of resilient slider members and methods of assembling such slider members onto interlocking fastening strips are disclosed herein. The slider member (200) comprises a pair of spaced-apart side walls (210, 230) and an intermediate body portion (250) therebetween. In addition, each side wall includes an interior surface (215) with an inwardly projecting shoulder (216) formed thereon, an exterior surface (217), and opposed end surfaces (218). The method of assembling a slider member (200) onto interlocking fastening strips (110) includes the acts of: engaging respective side walls (210, 230) of a slider member with first and second tools (260, 270); moving the first tool (260) away from the second tool (270) to resiliently spread apart the side walls (210, 230) of the slider member; inserting interlocking fastening strips (110) between the spread apart side walls (210, 230) of the slider member; and releasing the first and second tools (260, 270) from engagement with the side walls (210, 230) of the slider member to permit the side walls (210, 230) to resiliently return to a relaxed position wherein the shoulders (216, 236) formed on the interior surfaces of the side walls (210, 230) are positioned to obstruct removal of the slider member (200) from the interlocking fastening strips (110).

22 Claims, 13 Drawing Sheets

METHOD AND APPARATUS FOR ASSEMBLING SLIDER MEMBERS ONTO INTERLOCKING FASTENING STRIPS USING A RAIL

FIELD OF THE INVENTION

The present invention relates generally to closure devices having slider members movably installed upon interlocking fastening strips and, more particularly, to a method and apparatus for assembling slider members onto such fastening.strips. The invention may be employed in traditional fastener areas and is particularly well suited for use in assembling closure devices for flexible storage containers, such as plastic bags.

BACKGROUND OF THE INVENTION

The use of closure devices for fastening storage containers, including plastic bags, is generally well known. Furthermore, the manufacture of closure devices made of plastic materials is generally well known to those skilled in the art, as demonstrated by the numerous patents in this area.

A particularly well-known use for closure devices is in connection with flexible storage containers, such as plastic bags. Such closure devices provide a convenient way to close the bag in order to retain matter therein.

Conventional closure devices typically utilize mating fastening strips or closure elements which are used to selectively seal the bag. With such closure devices, however, it is often difficult to determine whether the fastening strips are fully occluded. This problem is particularly acute when the fastening strips are relatively narrow. Accordingly, when such fastening strips are employed, there exists a reasonable likelihood that the closure device is at least partially open.

Such fastening strips are particularly difficult to manipulate or handle by individuals with limited manual dexterity. Thus, in order to assist these individuals and for ease of use by individuals with normal dexterity, the prior art has provided sliders for use in opening and closing the fastening strips, as disclosed, for example, in U.S. Pat. Nos. 4,199,845, 5,007,142, 5,007,143, 5,010,627, 5,020,194, 5,070,583, 5,283,932, 5,301,394, 5,426,830, 5,431,760, 5,442,838, and 5,448,808. Some of these sliders include a separator finger which extends at least partially between the fastening strips. When the slider is moved in the appropriate direction, the separator finger divides the fastening strips and opens the bag.

While the use of a slider certainly facilitates the opening and closing of interlocking fastening strips, there are certain difficulties involved with installing and assembling the slider onto the fastening strips and with retaining the slider thereon. In an attempt to rectify some of these difficulties, the prior art has provided a variety of slider designs including various single-piece sliders, as disclosed, for example, in U.S. Pat. Nos. 5,010,627, 5,067,208, 5,070,583, and 5,448,808. Such slider members, however, suffer from assorted deficiencies including, for example, a relatively complex construction, a high relative cost, and a design which lends itself to difficult assembly onto the interlocking fastening strips.

OBJECTS OF THE INVENTION

Accordingly, a general object of the present invention is to provide a method of assembling slider members onto interlocking fastening strips which overcomes deficiencies in the prior art.

A more specific object of the present invention is to provide a method of conveniently assembling slider members onto interlocking fastening strips.

A related object of the present invention is to provide a slider member which facilitates convenient assembly onto interlocking fastening strips.

A further object of the present invention is to provide a method as characterized above which operates in a simple and economical manner.

An additional object of the present invention is to provide a method as characterized above which lends itself to reliable operation and use.

SUMMARY OF THE INVENTION

In accordance with these and other objects, several embodiments of slider members and methods of assembling such slider members onto interlocking fastening strips are disclosed herein. The slider member comprises a pair of spaced-apart side walls and an intermediate body portion therebetween. In addition, each side wall includes an interior surface with an inwardly projecting shoulder formed thereon, an exterior surface, and opposed end surfaces which interconnect the interior and exterior surfaces. The method of assembling such slider members onto interlocking fastening strips comprises the steps of: engaging respective side walls of a slider member with first and second tools; moving the first tool away from the second tool to resiliently spread apart the side walls of the slider member; inserting interlocking fastening strips between the spread apart side walls of the slider member; and releasing the first and second tools from engagement with the side walls of the slider member to permit the side walls to resiliently return to a relaxed position wherein the shoulders formed on the interior surfaces of the side walls are positioned to obstruct removal of the slider member from the interlocking fastening strips.

These and other objects, features, and advantages of the present invention will become more readily apparent upon reading the following detailed description of the illustrated embodiments and upon reference to the accompanying drawings wherein:

Figure 1:
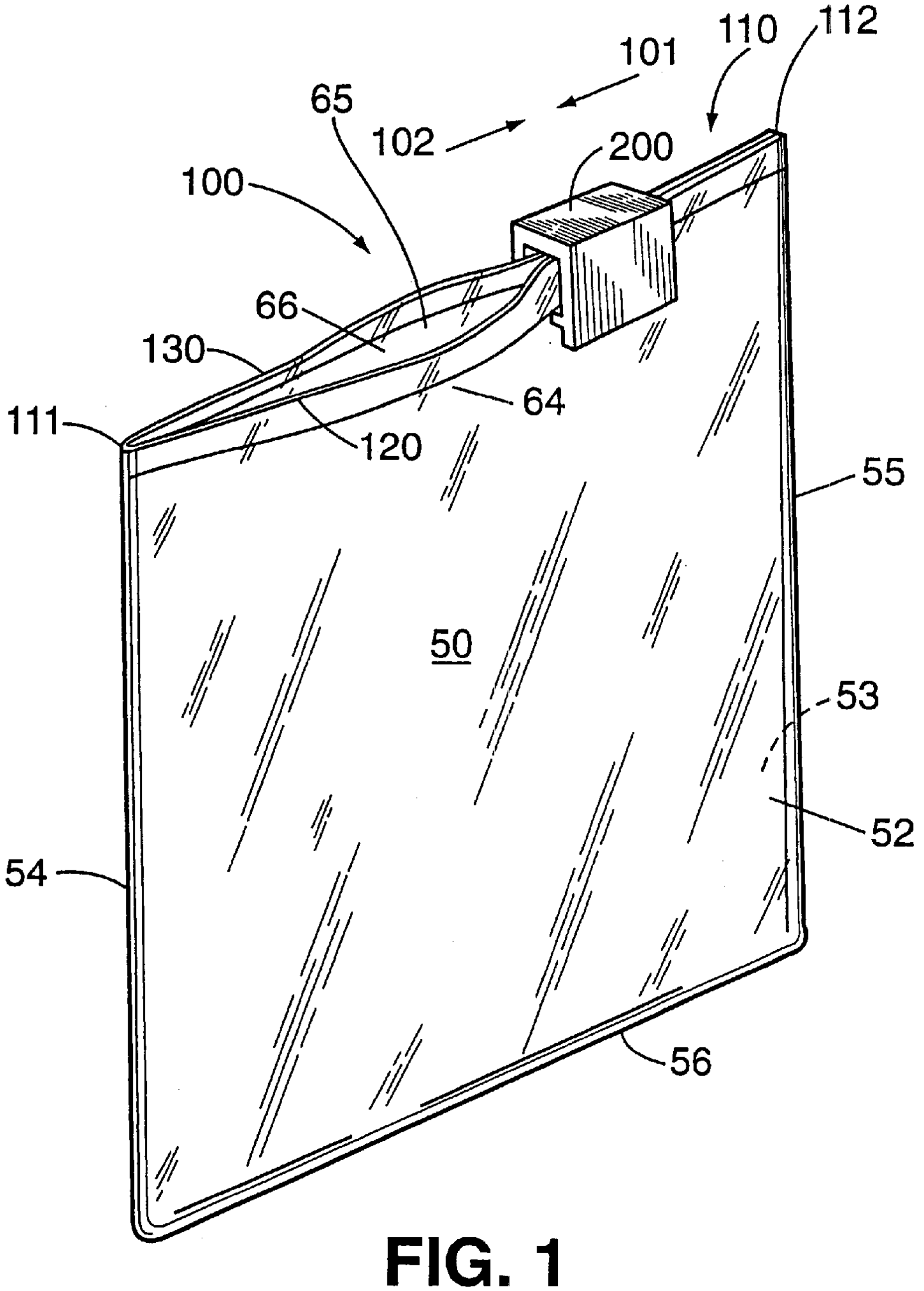
FIG. 1 is a perspective view of a storage container in the form of a plastic bag utilizing a closure device comprised of interlocking fastening strips and a slider member in accordance with a first embodiment of the present invention.

While the present invention is susceptible to various modifications and alternative constructions, certain illustrated embodiments thereof have been shown in the drawings and will be described in greater detail below. It should be understood, however, that there is no intention to limit the present invention to the disclosed structural forms. On the contrary, the intention is to cover all modifications, alternative constructions, and equivalents that fall within the spirit and scope of the present invention as defined by the appended claims.

DETAILED DESCRIPTION OF THE ILLUSTRATED EMBODIMENTS

Turning now to the drawings, and more particularly to FIG. 1, a closure device constructed in accordance with the present invention is generally designated by reference numeral 100. The closure device 100 is intended for use with a storage container 50, such as a conventional plastic bag, which includes a pair of complementary sheets or opposing flexible side walls 52, 53 attached at their lateral sides 54, 55 and bottom 56 to form a storage compartment. As is customary in the art, the complementary sheets 52, 53 are also unattached at their upper edge portions 64 to form a mouth 66 for the storage container 50. Although a rectangularly-shaped storage container or bag 50 is specifically illustrated herein, it will be readily appreciated by those skilled in the art that other bag configurations may alternatively be employed without departing from the scope or spirit of the present invention.

As best shown in FIG. 1, the closure device 100 includes a pair of interlocking fastening strips 110 which are disposed along the upper edge portions 64, 65 of the opposing side walls 52, 53. The closure device 100 also includes a resilient slider member which is slidably installed upon and assembled onto the interlocking fastening strips 110 in accordance with a method of the present invention. More specifically, a first fastening strip 120 is attached to the upper edge portion 64 of one of the side walls 52, an affiliated second fastening strip 130 is attached to the upper edge portion 65 of the other side wall 53, and the slider member is assembled onto both the first and second fastening strips 120, 130 in a slidable manner. As will be described more fully below, several different embodiments of slider members 200, 300, 400, 500, 600, and 700 and methods of assembling these and other slider members onto interlocking fastening strips 110 are disclosed herein at FIGS. 1–7, 8–14, 15–20, 21–28, 29–34, and 35–39, respectively.

While the drawings show the interlocking fastening strips 110 in a rather schematic fashion, those skilled in the art will readily appreciate that the interlocking fastening strips 110 may take virtually any form. By way of non-limiting example, the interlocking fastening strips 110 may comprise: (1) U-channel closure strips, as disclosed in U.S. Pat. No. 4,829,641; (2) shear action or Z-axis closure strips, as disclosed in PCT patent application Ser. No. PCT/U.S. 99/13246 (3) arrowhead-type closure strips, as disclosed in U.S. Pat. Nos. 3,198,228 (which reissued as Re. 28,969), 4,736,496, and 5,363,540; (4) "rolling action" closure strips, as disclosed in U.S. Pat. No. 5,007,143; or (5) "profile" closure strips, as disclosed in U.S. Pat. No. 5,664,299. All of the above-identified patents and applications are hereby incorporated by reference in their entireties.

Once the slider member has been assembled onto the interlocking fastening strips 110 in accordance with the present invention, the slider member may be moved thereaalong to facilitate the occlusion and deocclusion of the fastening strips 110. For example, when slider member 200 is moved in an occlusion direction, as indicated by reference numeral 101 in FIG. 1, it facilitates the occlusion of the interlocking fastening strips 110. Conversely, when slider member 200 is moved in a deocclusion direction, as indicated by reference numeral 102 in FIG. 1, it facilitates the deocclusion of the interlocking fastening strips 110. The other embodiments of the slider member operate in a similar manner once they have been assembled onto the interlocking fastening strips.

As shown in FIGS. 1–7, the first embodiment of the slider member 200 includes a pair of spaced-apart side walls 210, 230 which are adapted to be positioned on opposite sides of the interlocking fastening strips 110, and an intermediate body portion 250 therebetween which is adapted to be positioned upon and installed above the interlocking fastening strips 110. Mote specifically, the intermediate body portion 250 is integrally connected to or combined with upper ends 211, 231 of the first and second side walls 210, 230, as shown in FIGS. 2–7. On account of this construction, the slider member 200 has a generally inverted U-shaped configuration when viewed from the front and rear.

Figure 2:
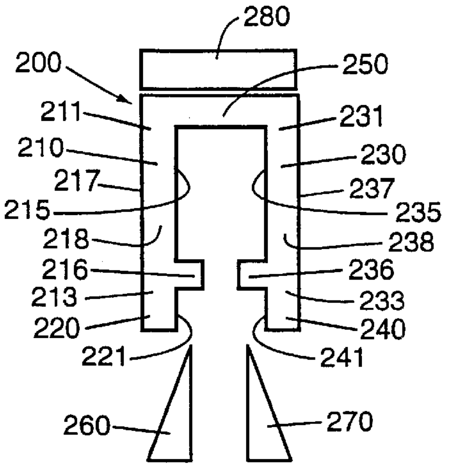
FIGS. 2–7 are enlarged front end views of the closure device depicted in FIG. 1, showing the slider member being sequentially assembled onto the interlocking fastening strips in accordance with a method of the present invention.
Figure 3:
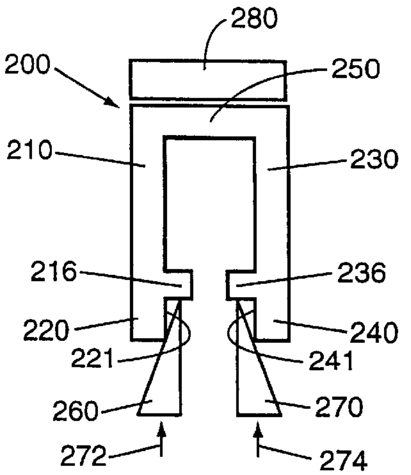

As best shown in FIG. 2, the first side wall 210 of the slider member 200 includes a generally planar interior surface 215 with an inwardly projecting shoulder 216 formed thereon, a generally planar exterior surface 217, a pair of opposed and generally planar end surfaces 218 and a downwardly extending protrusion 220 located beneath the shoulder 216 at a lower end 213 of the side wall 210. Likewise, the second side wall 220 includes a generally planar interior surface 235 with an inwardly projecting shoulder 236 formed thereon, a generally planar exterior surface 237, a pair of opposed and generally planar end surfaces 238 and a downwardly extending protrusion 240 located beneath the shoulder 236 at a lower end 233 of the side wall 230.

In keeping with an important aspect of the present invention, the slider member 200 may be conveniently assembled onto the interlocking fastening strips 110 in the following manner. To begin the assembly process, the side walls 210, 230 of the slider member 200 are engaged by first and second tools 260, 270. More particularly, the first and second tools 260, 270 are inserted between the side walls 210, 230 of slider member 200, as shown, for example, by arrows 272, 274 in FIG. 3, until the first tool 260 engages an inside surface 221 of protrusion 220 and the second tool 270 engages an inside surface 241 of protrusion 240.

Figure 4:
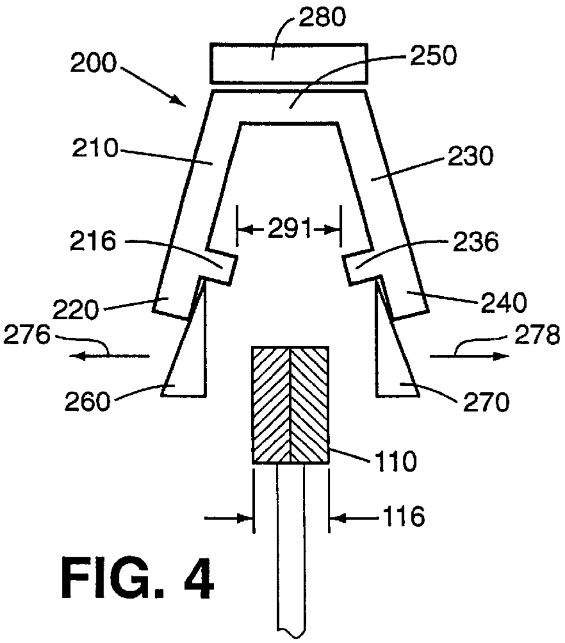

Next, the first tool 260 is moved away from the second tool 270 to resiliently spread apart the side walls 210, 230 of the slider member 200, as shown, for example, in FIG. 4. While the first tool 260 may be moved away from the second tool 270 in a variety of ways to resiliently spread apart the side walls 210, 230, the first and second tools 260, 270 of the illustrated embodiment are shown moving away from each other in a generally linear manner as indicated by arrows 276, 278 in FIG. 4. This spreading apart of the side walls 210, 230 continues until the shoulders 216, 236 formed on the interior surfaces 215, 235 of the side walls 210, 230 are separated by a gap 291 which is large enough to receive the interlocking fastening strips 110 therebetween and is greater than or equal to the width 116 of the fastening strips 100, as shown, for example, in FIG. 4. In order to facilitate this spreading apart of the side walls 210, 230, the relative pliability of the slider member 200 may be temporarily increased by performing certain material softening operations thereon including, for example, heating the slider member 200 or treating the slider member 200 with a softening agent. For example, the softening agent may be water or moisture when the slider member is made of nylon.

A third tool 280 may be positioned above and proximate to the intermediate body portion 250 of the slider member 200, as shown in FIGS. 2–7 to prevent or obstruct inadvertent disengagement between the side walls 210, 230 and the first and second tools 260, 270 as the side walls 210, 230 are being resiliently spread apart. Although the third tool 280 is shown directly above but spaced-apart from the intermediate body portion 250, those skilled in the art will readily appreciate that this tool 280 may alternatively be positioned such that it abuts the intermediate body portion 250.

Once the side walls 210, 230 of the slider member 200 have been spread apart a sufficient amount, the interlocking fastening strips 110 are inserted between the spread apart side walls 210, 230 by moving the fastening strips 110, the slider member 200 or both relative to each other. For example, the interlocking fastening strips 110 may be moved upwardly between the spread apart side walls 210, 230, as shown by arrow 281 in FIG. 5, to insert the fastening strips 110 therebetween. This upward movement of the interlocking fastening strips 110 should continue until the fastening strips 110 are positioned substantially between the intermediate body portion 250 of the slider member 200 and the shoulders 216, 236 of the side walls 210, 230.

Figure 6:
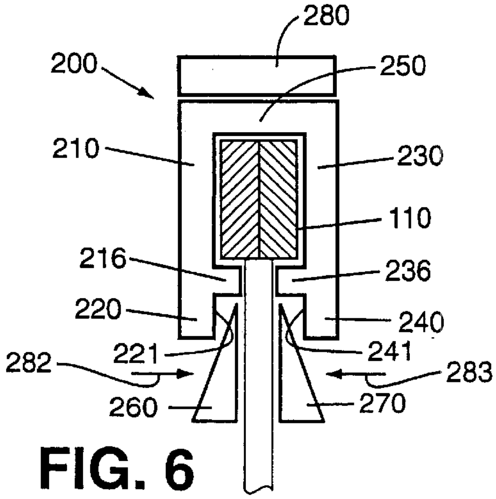
Figure 7:
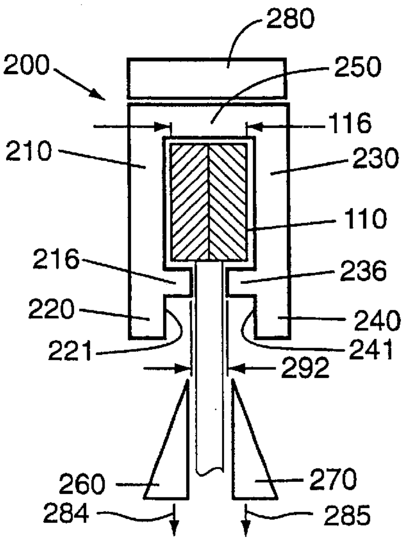

After the interlocking fastening strips 110 are received between the spread apart side walls 210, 230 of the slider member 200, the first and second tools 260, 270 are then released from engagement with the side walls 210 and 230 of the slider member 200 to permit the side walls 210, 230 to resiliently return to a relaxed or normal position, as shown, for example, in FIGS. 6 and 7. In the relaxed position, the shoulders 216, 236 of the side walls 210, 230 are positioned to prevent or obstruct removal of the slider member 200 from the interlocking fastening strips 110. To this end, the shoulders 216, 236 are separated by a second gap 292 which is smaller than the width 116 of the fastening strips 110, as shown, for example, in FIG. 7. In this way, the interlocking fastening strips 110 are effectively entrapped between the intermediate body portion 250 of the slider member 200 and the shoulders 216, 236 of the side walls 210, 230.

The return of the side walls 210, 230 to the relaxed position may occur in two ways. In the first way the first tool 260 is moved toward the second tool 270, as shown, for example, by arrows 282, 283 in FIG. 6, until the first and second tools 260, 270 become disengaged from the inside surfaces 221, 241 of the protrusions 220, 240. While the first tool 260 may be moved toward the second tool 270 in a variety of ways to allow the side walls 210, 230 to resiliently return the relaxed position, the first and second tools 260, 270 of the illustrated embodiment are shown moving toward each other in a generally linear manner by arrows 282, 283. Thereafter, the first and second tools 260, 270 may be collectively withdrawn from between the protrusions 220, 240 of the side walls 210, 230, as shown, for example, by arrows 284, 285 in FIG. 7.

Figure 5:
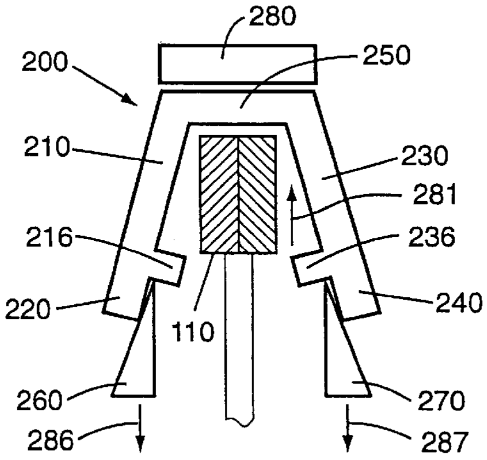

In the second way, the side walls 210, 230 may return to the relaxed position by moving the first tool 260 or the second tool 270 or both tools 260, 270 in a downward direction as shown by arrows 286, 287 in FIG. 5 until the tools 260, 270 disengage the side walls 210, 230. When the tools 260, 270 disengage, the side walls 210, 230 return to the position shown in FIG. 7 and the linear movement 282, 283 of the tools 260, 270, as shown in FIG. 6 is not necessary.

Once the slider member 200 has been assembled onto the interlocking fastening strips 110 in this manner, it may be manually slid therealong to either close or open the fastening strips 110. For example, when the slider member 200 is moved in the occlusion direction 101, as shown in FIG. 1, the slider member 200 facilitates the occlusion of the fastening strips 110. When the slider member 200 is moved in the deocclusion direction 102, conversely, the slider member 200 facilitates the deocclusion of the fastening strips 110. The intermediate body portion 250 of the slider member 200 is positioned above the interlocking fastening strips 110, and the side walls 210, 230 of the slider member 200 are positioned on opposite sides of the interlocking fastening strips 110.

In another embodiment similar to the first embodiment, the angle of the tools is increased. In addition, the fastening strips are positioned between the tools. The slider is moved toward the tools and the side walls of the slider are spread apart as the side walls contact the tools. Since the fastening strips are between the tools, the fastening strips are also between the side walls of the slider. Once the fastening strips are between the side walls, the tools are withdrawn and the slider is released onto the fastening strips.

The second embodiment of the slider member 300 is shown in FIGS. 8–14. Like the first embodiment of the slider member 200, the second embodiment of the slider member 300 includes a pair of spaced-apart side walls 310, 330 which are adapted to be positioned on opposite sides of the interlocking fastening strips 110, and an intermediate body portion 350 which is adapted to be positioned upon and installed above the interlocking fastening strips 110. More specifically, the intermediate body portion 350 is integrally connected to or combined with upper ends 311, 331 of the first and second side walls 310, 330, as shown, for example, in FIGS. 9–14. On account of this construction, the slider member 300 has a generally inverted U-shaped configuration when viewed from the front and rear.

Figure 8:
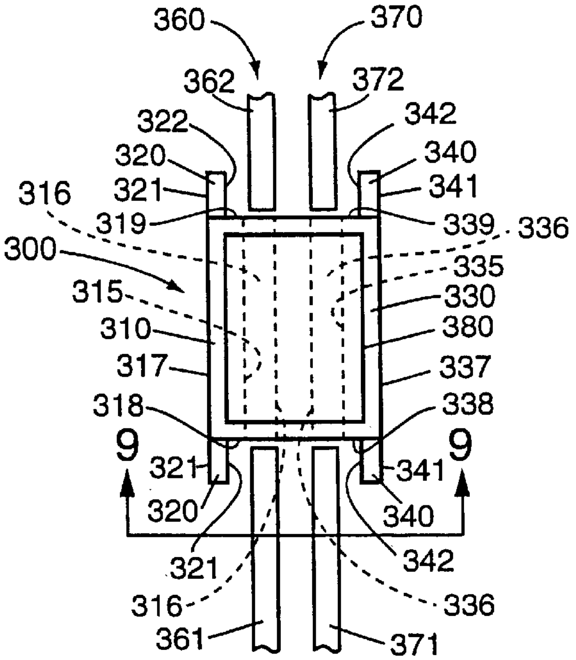
FIG. 8 is a top plan view showing a slider member in accordance with a second embodiment of the present invention.
Figure 9:
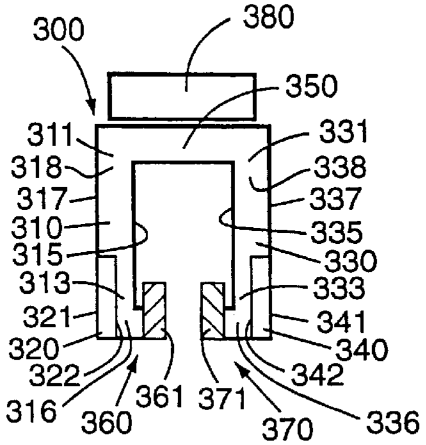
FIGS. 9–14 are front end views as seen substantially in the direction of line 9–9 of FIG. 8, showing the slider member being sequentially assembled onto interlocking fastening strips in accordance with a method of the present invention.
Figure 10:
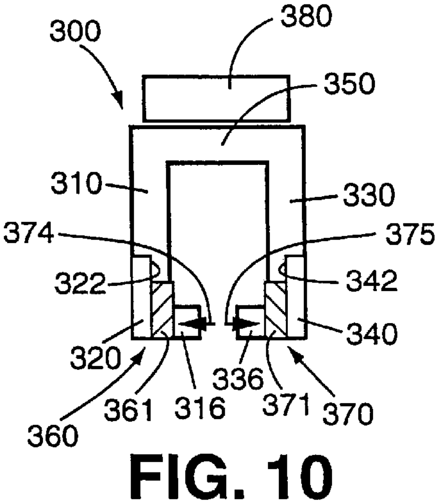

As best shown in FIGS. 8–10, the first side wall 310 of the slider member 300 includes an interior surface 315 with an inwardly projecting shoulder 316 formed thereon, an exterior surface 317, and opposed end surfaces 318, 319. Similarly, the second side wall 330 of the slider member 300 includes an interior surface 335 with an inwardly projecting shoulder 336 formed thereon, an exterior surface 337, and opposed end surfaces 338 and 339. In order to provide convenient tool engagement regions on the side walls 310, 330 of the slider member 300, an outwardly projecting lug 320 is formed on each of the two end surfaces 318, 319 of the first side wall 310 and an outwardly projecting lug 340 is formed on each of the two end surfaces 338, 339 of the second side wall 330. In the illustrated embodiment, these lugs 320, 340 are formed at lower ends 313, 333 of the first and second side walls 310, 330 and have outside surfaces 321, 341 which are substantially coplanar with the exterior surfaces 317, 337 of these side walls 310, 330.

In keeping with an important aspect of the present invention, the slider member 300 may be conveniently assembled onto the interlocking fastening strips 110 in the following manner. To initiate the assembly process, the side walls 310, 330 of the slider member 300 are engaged by first and second tools 360, 370, as shown, for example, in FIGS. 9 and 10. In particular, the first and second tools 360, 370 are positioned partially between the side walls 310, 330 of slider member 300, as shown in FIG. 9, and then are moved apart as indicated by arrows 374, 375 in FIG. 10 until the first tool 360 comes into contact with an inside surface 322 of lug 320 and the second tool 370 comes into contact with an inside surface 342 of lug 340.

In order to provide better tool engagement and spreading capability, the first and second tools 360 and 370 each have a primary segment 361 and 371, respectively, and a secondary segment 362 and 372, respectively. In usage, the primary and secondary segments 361, 362, 371, 372 of the first and second tools 360, 370 are positioned partially between the side walls 310, 330 of slider member 300 such that the primary and secondary segments 361, 362 of the first tool 360 engage the inside surfaces 322 of the two lugs 320 formed on the first side wall 310 and the primary and secondary segments 371, 372 of the second tool 370 engage the inside surfaces 342 of the two lugs 340 formed on the second side wall 330. While the first and second tools 360, 370 are shown and described herein as each having primary and secondary segments 361, 362, 371, 372, those skilled in the art will readily appreciate that the first and second tools 360, 370 may each alternatively comprise a single tool segment which is inserted completely or partially between the side walls 310, 330 of the slider member 300.

Figure 11:
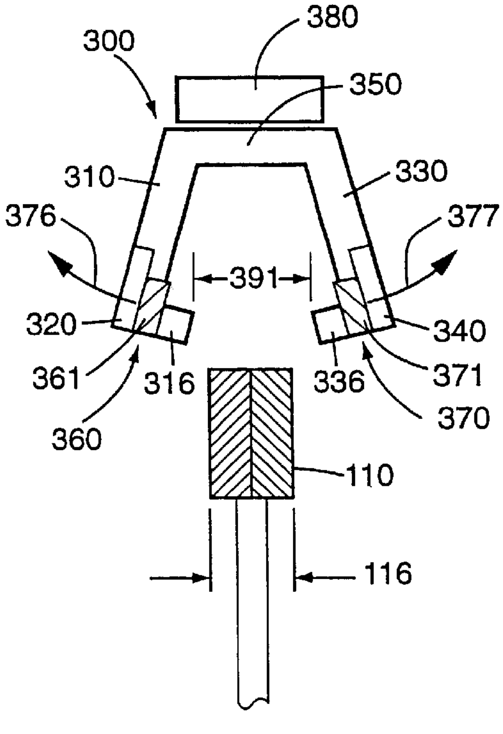
Figure 12:
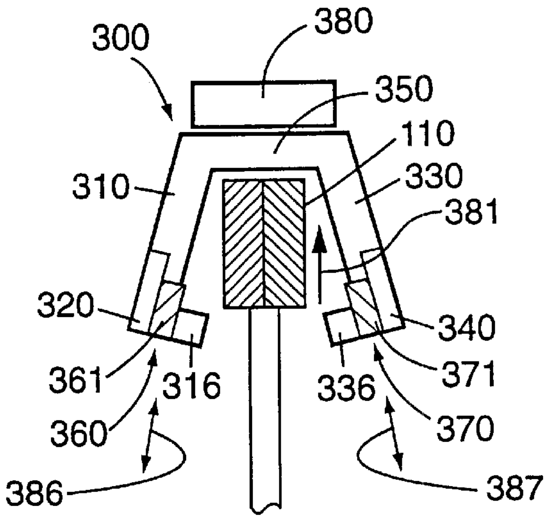

Next, the first tool 360 is moved away from the second tool 370 to resiliently spread apart the side walls 310, 330 of the slider member 300, as shown, for example, in FIG. 11. More specifically, the primary and secondary segments 361, 362 of the first tool 360 are moved away from the primary and secondary segments 371, 372 of the second tool 370 in a generally arcuate manner as indicated by arrows 376, 377 until the shoulders 316, 336 formed on the interior surfaces 315, 335 of the side walls 310, 330 are separated by a gap 391 which is large enough to receive the interlocking fastening strips 110 therebetween and is greater than or equal to the width 116 of the fastening strips 110. A third tool 380 may be positioned directly above and proximate to the intermediate body portion 350 of the slider member 300, as shown in FIGS. 9–14 to prevent or obstruct inadvertent disengagement between the side walls 310, 330 and the primary and secondary segments 361, 362, 371, 372 of the first and second tools 360, 370 as the side walls 310, 330 are being spread apart in this manner. The interlocking fastening strips 110 are then inserted between the spread apart side walls 310, 330 of the slider member 300 by moving the fastening strips 110, the slider member 300 or both relative to each other. For example, as shown in FIG. 12, the fastening strips 110 are moved upward as indicated by arrow 381 until the fastening strips 110 are positioned substantially between the intermediate body portion 350 of the slider member 300 and the shoulders 316, 336 of the side walls 310, 330.

Figure 13:
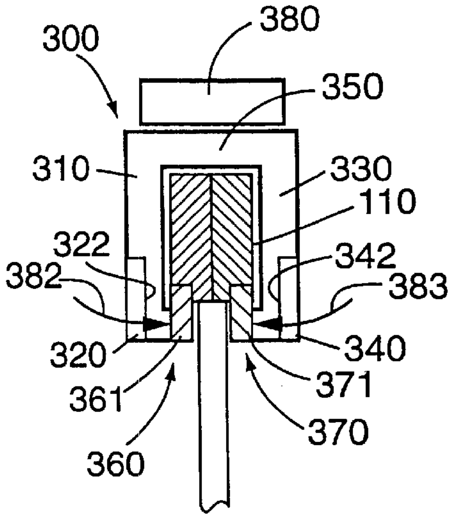
Figure 14:
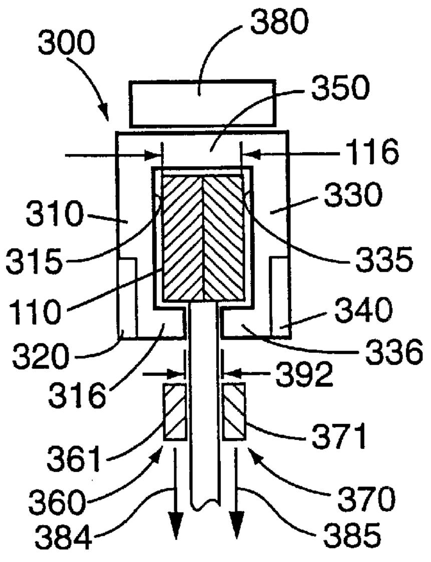

Once the interlocking fastening strips 110 are positioned between the spread apart side walls 310, 330 of the slider member 300, the first and second tools 360, 370 are then released from engagement with the side walls 310 and 330 of the slider member 300 to permit the side walls 310, 330 to resiliently return to a relaxed or normal position, as shown, for example, in FIGS. 13 and 14. In the relaxed position, the shoulders 316, 336 formed on the interior surfaces 315, 335 of the side walls 310, 330 are separated by a second gap 392, as shown, for example, in FIG. 14, which is smaller than the width 116 of the interlocking fastening strips 110. In this way, the shoulders 316, 336 are positioned to prevent or obstruct removal of the slider member 300 from the interlocking fastening strips 110 when the side walls 310 and 330 are in the relaxed position. The interlocking fastening strips 110 are also entrapped between the shoulders 316, 336 of the side walls 310, 330 and the intermediate body portion 350 of the slider member 300.

The return of the side walls 310, 330 to the relaxed position may occur in two ways. In the first way, the primary and secondary segments 361, 362 of the first tool 360 are moved toward the primary and secondary segments 371, 372 of the second tool 370 in a generally arcuate manner, as shown by arrows 382, 383 in FIG. 13, until the first and second tools 360, 370 are released from engagement with the side walls 310 and 330 of the slider member 300. In particular, this inward arcuate movement of the first and second tools 360, 370 continues until the primary and secondary segments 361, 362 of the first tool 360 become disengaged from the inside surfaces 322 of the lugs 320 formed on the first side wall 310 and the primary and secondary segments 371, 372 of the second tool 370 become disengaged from the inside surfaces 342 of the lugs 340 formed on the second side wall 330. Thereafter, the primary and secondary segments 361, 362, 371, 372 of the first and second tools 360, 370 may be collectively withdrawn from between the lugs 320, 340 of the side walls 310, 330, as shown, for example, by arrows 384, 385 in FIG. 14.

In the second way, the side walls 310, 330 may return to the relaxed position by moving the first tool 360 or the second tool 370 or both tools 360, 370 in an upward or downward direction as shown by arrows 386, 387 in FIG. 12 until the tools 360, 370 disengage the side walls 310, 330. When the tools 360, 370 disengage, the sidewalls 310, 330 return to the position shown in FIG. 14 and the arcuate movement of the tools 360, 3760 shown in FIG. 13 is not necessary.

Once the slider member 300 has been assembled onto the interlocking fastening strips 110 in this manner, it may be manually slid therealong to either occlude or deocclude the fastening strips 110. The intermediate body portion 350 of the slider member 300 is positioned above the interlocking fastening strips 110, and the side walls 310, 330 of the slider member 300 are positioned on opposite sides of the interlocking fastening strips 110.

As shown in FIGS. 15–20, the third embodiment of the slider member 400 includes a pair of spaced-apart side walls 410, 430 which are adapted to be positioned on opposite sides of the interlocking fastening strips 110, and an intermediate body portion 450 which is adapted to be positioned upon and installed above the interlocking fastening strips 110. More specifically, the intermediate body portion 450 is integrally connected to or combined with upper ends 411, 431 of the first and second side walls 410, 430. On account of this construction, the slider member 400 has a generally inverted U-shaped configuration when viewed from the front and rear.

Figure 15:
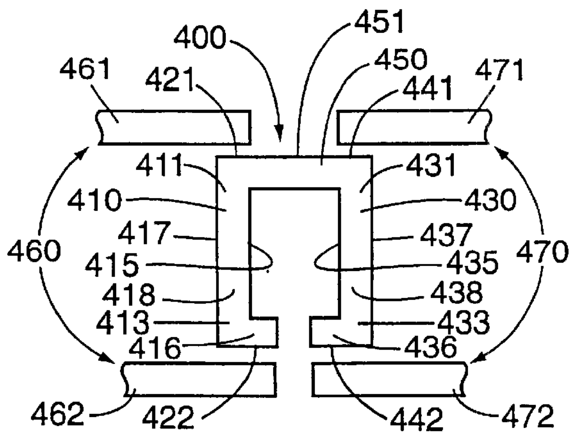
FIGS. 15–20 are front end views of a closure device, showing a third embodiment of a slider member being sequentially assembled onto interlocking fastening strips in accordance with a method of the present invention.
Figure 16:
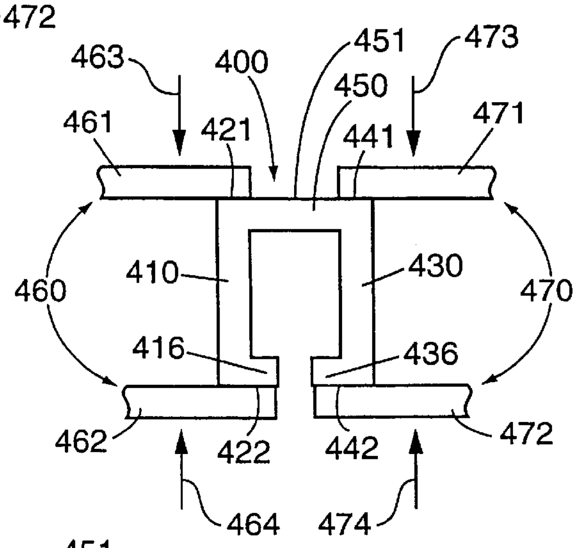

As shown in FIG. 15, the first side wall 410 of the slider member 400 includes an interior surface 415 with an inwardly projecting shoulder 416 formed thereon, an exterior surface 417, and a pair of opposed end surfaces 418. The first side wall 410 of the slider member 400 also includes an upper edge 421 and an opposed lower edge 422. In like manner, the second side wall 430 of the slider member 400 includes an interior surface 435 with an inwardly projecting shoulder 436 formed thereon, an exterior surface 437, a pair of opposed end surfaces 438 and opposed upper and lower edges 441 and 442, respectively.

In keeping with an important aspect of the present invention, the slider member 400 may be conveniently assembled onto the interlocking fastening strips 110 in the following manner. To begin the assembly process, the side walls 410, 430 of the slider member 400 are engaged by first and second tools 460, 470, as shown, for example, in FIGS. 15 and 16. More specifically, primary and secondary segments 461, 462 of the first tool 460 are moved toward each other as indicated by arrows 463, 464 to frictionally grasp or pinch the upper and lower edges 421, 422 of the first side wall 410, as shown, for example, in FIG. 16. At the same time or substantially contemporaneously therewith, primary and secondary segments 471, 472 of the second tool 470 are moved toward each other as indicated by arrows 473, 474 to frictionally grasp or pinch the upper and lower edges 441, 442 of the second side wall 430. While the first and second tools 460, 470 are shown and described herein as each having individual primary segments 461, 471, those skilled in the art will readily appreciate that the primary segments 461, 471 of the first and second tools 460, 470 may alternatively comprise a single tool segment which engages not only the upper edges 421, 441 of the first and second side walls 410, 430 but also a top surface 451 of the intermediate body portion 450.

Figure 17:
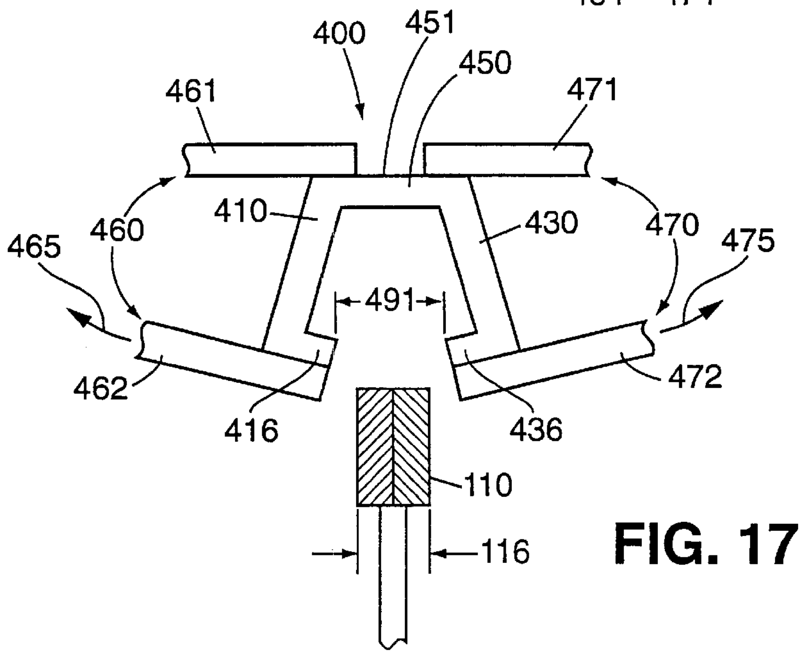

Next, the first tool 460 is moved away from the second tool 470 to resiliently spread apart the side walls 410, 430 of the slider member 400, as shown, for example, in FIG. 17. More specifically, the secondary segments 462, 472 of the first and second tools 460, 470 are moved away from each other in a generally arcuate manner, as indicated by arrows 465, 475 in FIG. 17, until the shoulders 416, 436 of the side walls 410, 430 are separated by a gap 491 which is large enough to receive the interlocking fastening strips 110 therebetween and is greater than or equal to the width 116 of the fastening strips 110.

The interlocking fastening strips 110 are then inserted between the spread apart side walls 410, 430 of the slider member 400 by moving the fastening strips 110, the slider member 400 or both relative to each other. For example, as shown in FIG. 18 the fastening strips 110 are moved upward as indicated by arrow 476 until the strips 110 are positioned substantially between the intermediate body portion 450 of the slider member 400 and the shoulders 416, 436 of the side walls 410, 430.

Figure 20:
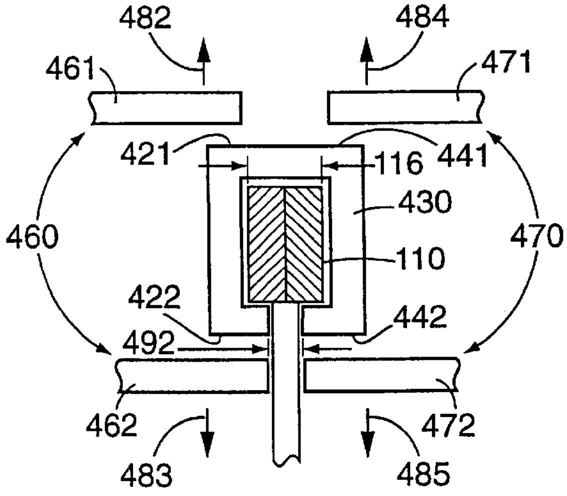

Once the interlocking fastening strips 110 have been received between the spread apart side walls 410, 430 of the slider member 400, the first and second tools 460, 470 are then released from engagement with the side walls 410, 430 of the slider member 400 to permit the side walls 410, 430 to resiliently return to a relaxed or normal position, as shown, for example, in FIG. 20. In the relaxed position, the shoulders 416, 436 of the side walls 410, 430 are separated by a second gap 492, as shown, for example, in FIG. 20, which is smaller than the width 116 of the interlocking fastening strips 110. In this way, the shoulders 416, 436 are positioned to prevent or obstruct removal of the slider member 400 from the interlocking fastening strips 110 when the side walls 410, 430 are in the relaxed position. The interlocking fastening strips 110 are also entrapped between the intermediate body portion 450 of the slider member 400 and the shoulders 416, 436 of the side walls 410, 430.

The return of the side walls 410, 430 to the relaxed position may occur in two ways. In the first way, the secondary segments 462, 472 of the first and second tools 460, 470 are moved toward each other in a generally arcuate manner, as shown, for example, by arrows 477, 478 in FIG. 19, until the side walls 410, 430 are no longer substantially spread apart. Thereafter, the primary and secondary segments 461, 462 of the first tool 460 and the primary and secondary segments 471, 472 of the second tool 470 are each moved away from each other, as shown by arrows 482, 483, 484, 485 in FIG. 20, until the first and second tools 460, 470 are released from engagement with the upper and lower edges 421, 422, 441, 442 of the side walls 410, 430.

Figure 18:
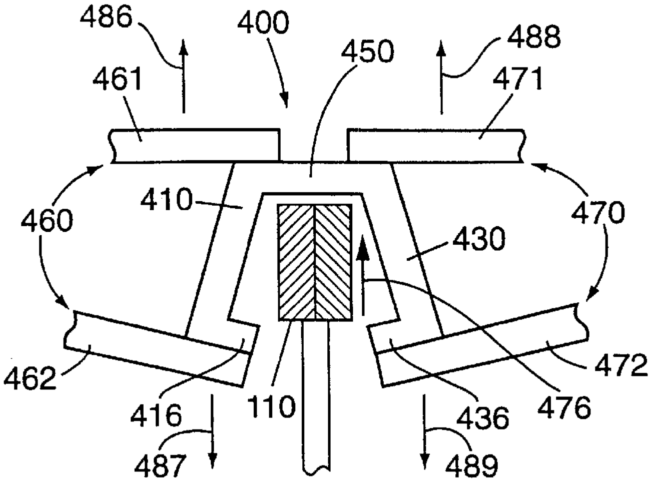
Figure 19:
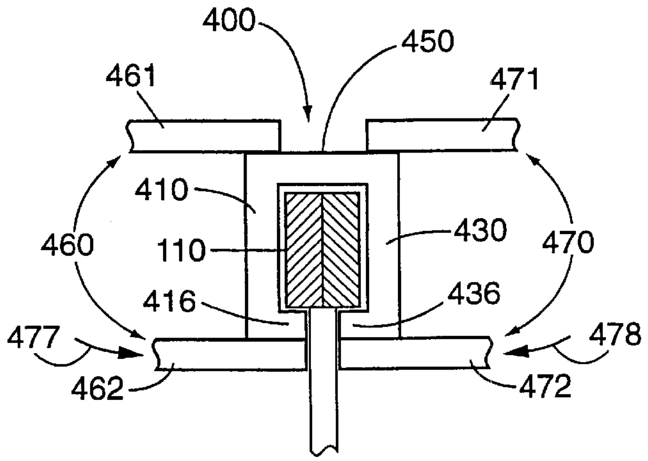

In the second way, the side walls 410, 430 may return to the relaxed position by disengaging the first tool 460 or the second tool 470 or both tools 460, 470 from the side walls 410, 430 as indicated by arrows 486, 487, 488, 489, when the slider 400 is in the position shown in FIG. 18. When the tools 460, 470 disengage, the side walls 410, 430 return to the position shown in FIG. 20 and the arcuate movement of the tools 460, 470 shown in FIG. 19 is not necessary.

Once the slider member 400 has been assembled onto the interlocking fastening strips 110 in this manner, it may be manually slid therealong to either close or open the fastening strips 110. The intermediate body portion 450 of the slider member 400 is positioned above the interlocking fastening strips 110, and the side walls 410, 430 of the slider member 400 are positioned on opposite sides of the interlocking fastening strips 110.

Figure 21:
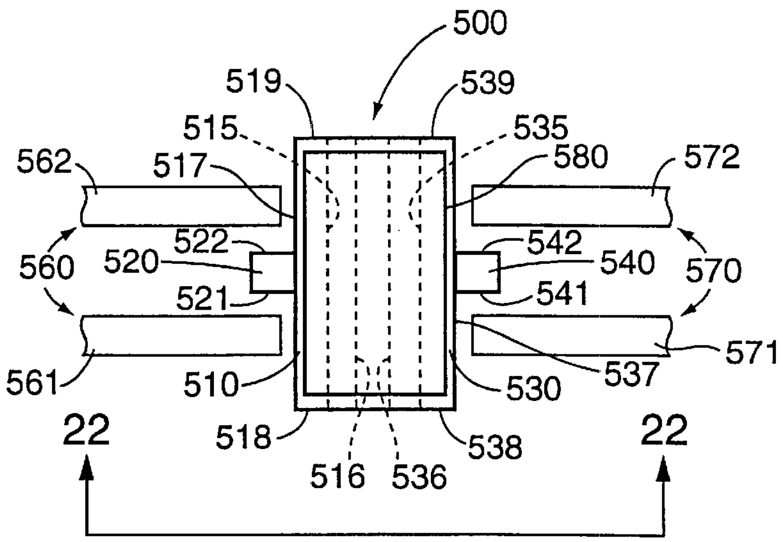
FIG. 21 is a top plan view showing a slider member in accordance with a fourth embodiment of the present invention.
Figure 22:
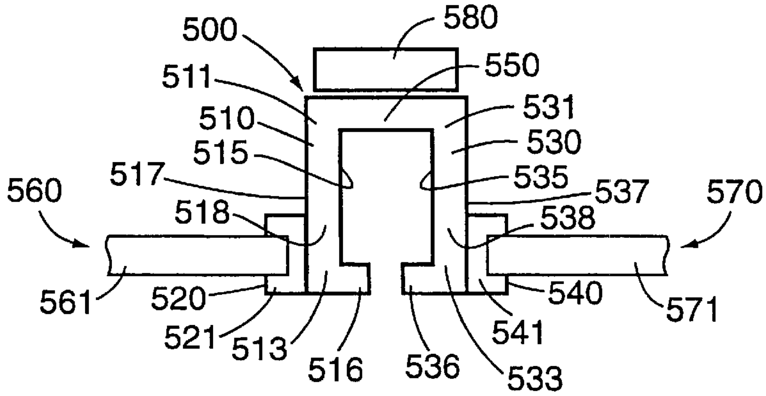
FIGS. 22–26 are front end views as seen substantially in the direction of line 22—22 of FIG. 21, showing the slider member being sequentially assembled onto interlocking fastening strips in accordance with a method of the present invention.
Figure 23:
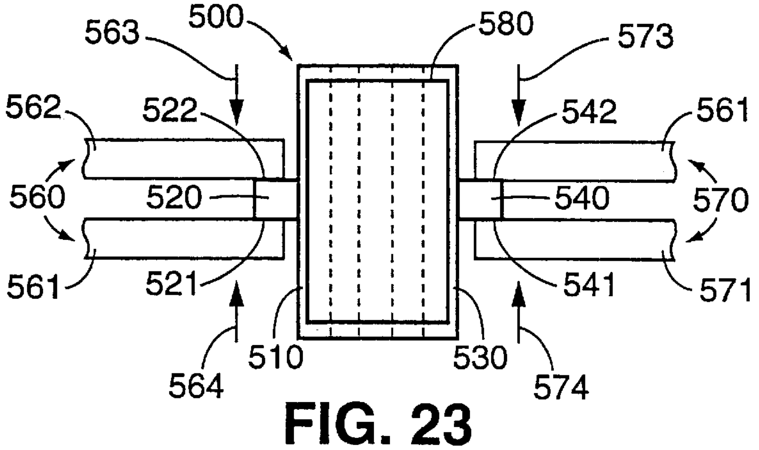

The fourth embodiment of the slider member 500 is shown in FIGS. 21–28. The fourth embodiment of the slider member 500 includes a pair of spaced-apart side walls 510, 530 which are adapted to be positioned on opposite sides of the interlocking fastening strips 110, and an intermediate body portion 550 which is adapted to be positioned upon and installed above the interlocking fastening strips 110. More specifically, the intermediate body portion 550 is integrally connected to or combined with upper ends 511, 531 of the first and second side walls 510, 530, as shown in FIG. 22. On account of this construction, the slider member 500 has a generally inverted U-shaped configuration when viewed from the front and rear as shown for example in FIG. 22.

As shown in FIGS. 21 and 22, the first side wall 510 of slider member 500 includes an interior surface 515 with an inwardly projecting shoulder 516 formed thereon, an exterior surface 517, and a pair of opposed end surfaces 518, 519. Likewise, the second side wall 530 of slider member 500 includes an interior surface 535 with an inwardly projecting shoulder 536 formed thereon, an exterior surface 537, and a pair of opposed end surfaces 538, 539. In order to provide convenient tool engagement regions on the side walls 510, 530 of the slider member 500, an outwardly projecting ear 520 is formed on the exterior surface 517 of side wall 510 and an outwardly projecting ear 540 is formed on the exterior surface 537 of side wall 530. The ears 520,

540 have opposed side surfaces 521, 522, 541, 542, as shown, for example, in FIG. 21. In the illustrated embodiment, the ears 520, 540 are formed at lower ends 513, 533 of the first and second side walls 510, 530, as shown, for example, in FIG. 22. The ears 520, 540 are also formed at a generally central location with respect to the opposed end surfaces 518, 519, 538, 539 of the first and second side walls 510, 530 as shown, for example, in FIG. 21.

In keeping with an important aspect of the present invention, the slider member 500 may be conveniently assembled onto the interlocking fastening strips 110 in the following manner. To initiate the assembly process, the side walls 510, 530 of the slider member 500 are engaged by first and second tools 560, 570. More specifically, primary and secondary segments 561, 562 of the first tool 560 are moved together, as shown, for example, by arrows 563, 564 in FIG. 23, to frictionally grasp or pinch the opposed side surfaces 521, 522 of ear 520. At the same time or substantially contemporaneously therewith, primary and secondary segments 571, 572 of the second tool 570 are moved together as indicated by arrows 573, 574 to frictionally grasp or pinch the opposed side surfaces 541, 542 of ear 540.

Figure 24:
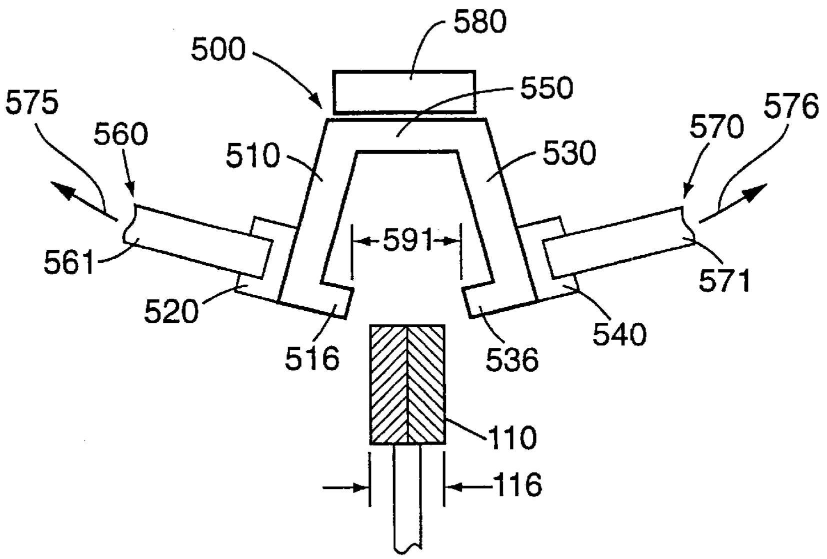

Next, the first tool 560 is moved away from the second tool 570, as shown, for example, in FIG. 24, to resiliently spread apart the side walls 510, 530 of the slider member 500. More specifically, the primary and secondary segments 561, 562 of the first tool 560 are moved away from the primary and secondary segments 571, 572 of the second tool 570 in a generally arcuate manner, as shown, for example, by arrows 575, 576 in FIG. 24. The movement continues until the shoulders 516, 536 of the side walls 510, 530 are separated by a gap 591 which is large enough to receive the interlocking fastening strips 110 therebetween and is greater than or equal to the width 116 of the fastening strips 110. A third tool 580 may be positioned directly above and proximate to the intermediate body portion 550 of the slider member 500, as shown, for example, in FIGS. 22 and 24–26 to prevent or obstruct inadvertent disengagement between the side walls 510, 530 and the first and second tools 560, 570 as the side walls 510, 530 are being spread apart.

Once the-side walls 510, 530 of the slider member 500 have been spread apart a sufficient amount, the interlocking fastening strips 110 are inserted between the spread apart side walls 510, 530 by moving the fastening strips 110, the slider member 500 or both relative to each other. For example, the fastening strips 110 are moved upwardly as indicated by arrow 577 between the spread apart side walls 510, 530 of the slider member 500, as shown, for example, in FIG. 25. This upward movement of the interlocking fastening strips 110 should continue until the fastening strips 110 are positioned substantially between the intermediate body portion 550 of the slider member 500 and the shoulders 516, 536 of the side walls 510, 530.

Figure 26:
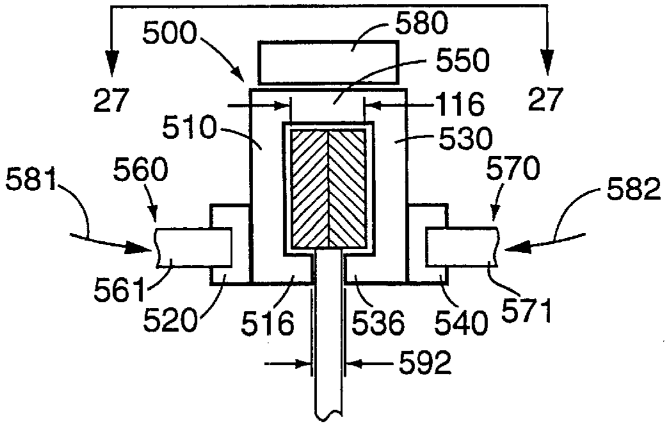
Figure 27:
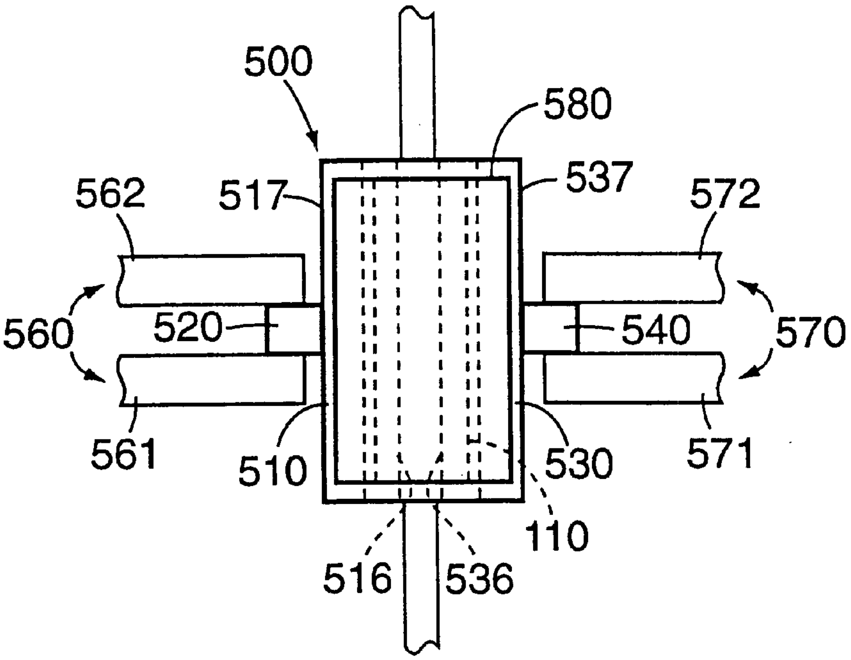
FIGS. 27 and 28 are top plan views as seen substantially in the direction of line 27—27 of FIG. 26.
Figure 28:
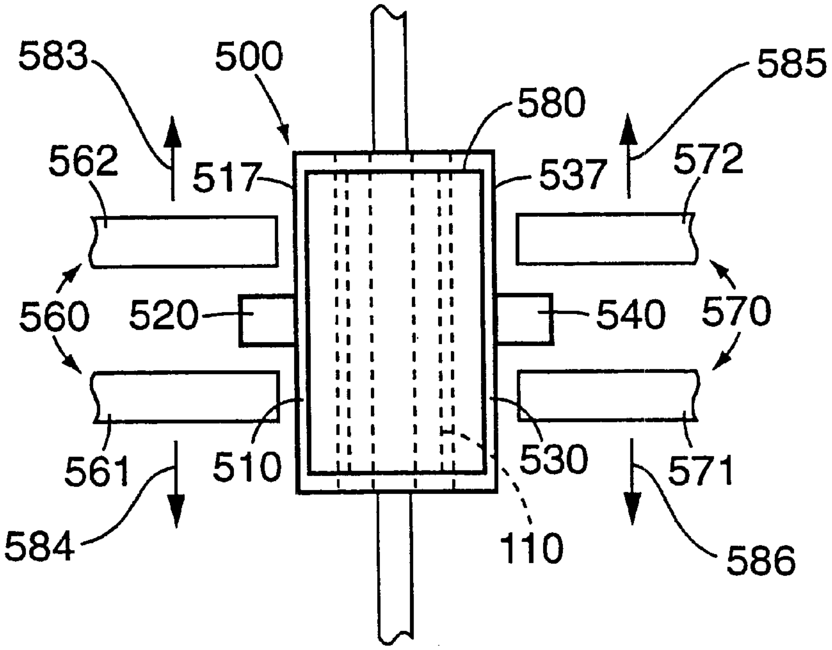

After the interlocking fastening strips 110 are positioned between the spread apart side walls 510, 530 of the slider member 500, the first and second tools 560, 570 are then released from engagement with the side walls 510, 530 of the slider member 500 to permit the side walls 510 and 530 to resiliently return to a relaxed or normal position, as shown, for example, in FIG. 26. In the relaxed position, the shoulders 516, 536 formed on the interior surfaces 515, 535 of the side walls 510, 530 are separated by a second gap 592, as shown in FIG. 26, which is smaller than the width 116 of the interlocking fastening strips 110. In this way, the shoulders 516, 536 are positioned to prevent or obstruct removal of the slider member 500 from the interlocking fastening strips 110 when the side walls 510, 530 are in the relaxed position. The interlocking fastening strips 110 are also entrapped between the shoulders 516, 536 of the side walls 510, 530 and the intermediate body portion 550 of the slider member 500.

The return of the side walls 510, 530 to the relaxed position may occur in two ways. In the first way, the primary and secondary segments 561, 562 of the first tool 560 are moved toward the primary and secondary segments 571, 572 of the second tool 570 in a generally arcuate manner, as shown, for example, by arrows 581, 582 in FIG. 26. Thereafter, the primary and secondary segments 561, 562, 571, 572 of the first and second tools 560, 570 are moved away from the ears 520, 540 of the side walls 510, 530, as shown, for example, by arrows 583, 584, 585, 586 in FIG. 28, to release the first and second tools 560, 570 from engagement with the side walls 510, 530 of the slider member 500.

Figure 25:
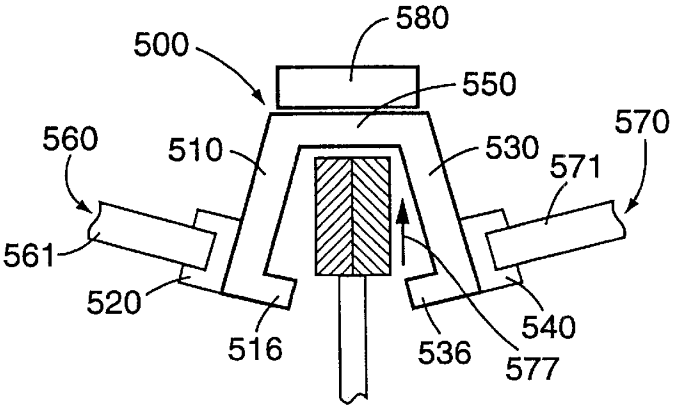

In the second way, the side walls 510, 530 may return to the relaxed position by disengaging the first tool 560 or the second tool 570 or both tools 560, 570 from the ears 520, 540 (as indicated by arrows 583–586 in FIG. 28) when the slider is in the position shown in FIG. 25. When the tools 560, 570 disengage, the side walls 510, 530 return to the position shown in FIG. 26 and the arcuate movement of the tools 560, 570 shown in FIG. 26 is not necessary.

Once the slider member 500 has been assembled onto the interlocking fastening strips 110 in this manner, it may be manually slid therealong to either separate or attach the fastening strips 110. The intermediate body portion 550 of the slider member 500 is positioned above the interlocking fastening strips 110, and the side walls 510, 530 of the slider member 500 are positioned on opposite sides of the interlocking fastening strips 110.

As shown in FIGS. 29–34, the fifth embodiment of the slider member 600 includes a pair of spaced-apart side walls 610, 630 which are adapted to be positioned on opposite sides of the interlocking fastening strips 110, and an intermediate body portion 650 which is adapted to be positioned upon and installed above the interlocking fastening strips 110. More specifically, the intermediate body portion 650 is integrally connected to or combined with upper ends 611, 631 of the first and second side walls 610, 630. On account of this construction, the slider member 600 has a generally inverted U-shaped configuration when viewed from the front and rear as shown, for example, in FIGS. 29 and 30.

Figure 29:
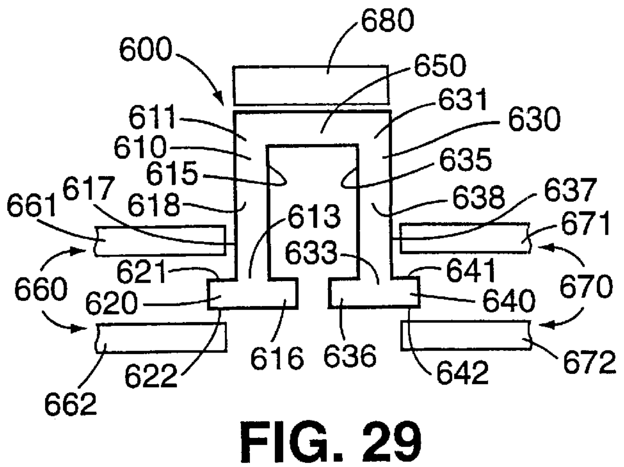
FIGS. 29–34 are front end views of a closure device, showing a fifth embodiment of a slider member being sequentially assembled onto interlocking fastening strips in accordance with a method of the present invention.
Figure 30:
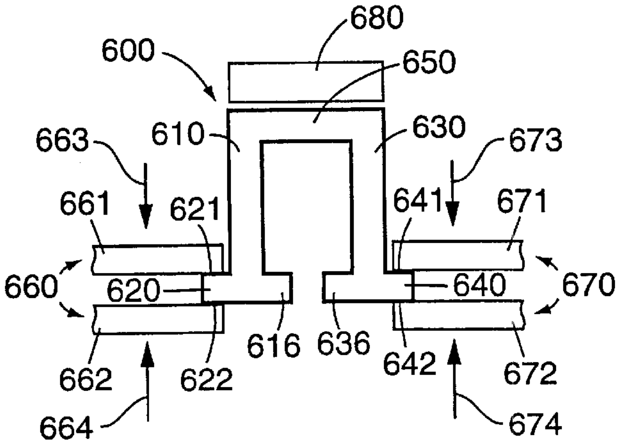

As shown in FIG. 29, the first side wall 610 of slider member 600 includes an interior surface 615 with an inwardly projecting shoulder 616 formed thereon, an exterior surface 617, and a pair of opposed end surfaces 618. Similarly, the second side wall 630 of slider member 600 includes an interior surface 635 with an inwardly projecting shoulder 636 formed thereon, an exterior surface 637, and a pair of opposed end surfaces 638. In order to provide convenient tool engagement regions on the side walls 610, 630 of the slider member 600, a first ledge 620 projects outwardly from the exterior surface 617 of side wall 610 and a second ledge 640 projects outwardly from the exterior surface 637 of side wall 630. In the illustrated embodiment, these ledges 620, 640 are formed at lower ends 613, 633 of the first and second side walls 610 and 630 and have opposed upper and lower surfaces 621, 622, 641, 642.

In keeping with an important aspect of the present invention, the slider member 600 may be conveniently assembled onto the interlocking fastening strips 110 in the following manner. To begin the assembly process, the side walls 610, 630 of the slider member 600 are engaged by first and second tools 660, 670. More specifically, primary and secondary segments 661, 662 of the first tool 660 are moved together as indicated by arrows 663, 664 to frictionally grasp or pinch the upper and lower side surfaces 621, 622 of ledge 620, as shown, for example, in FIGS. 29 and 30, and primary and secondary segments 671, 672 of the second tool 670 are moved together as indicated by arrows 673, 674 to frictionally grasp of pinch the upper and lower side surfaces 641, 642 of ledge 640.

Figure 31:
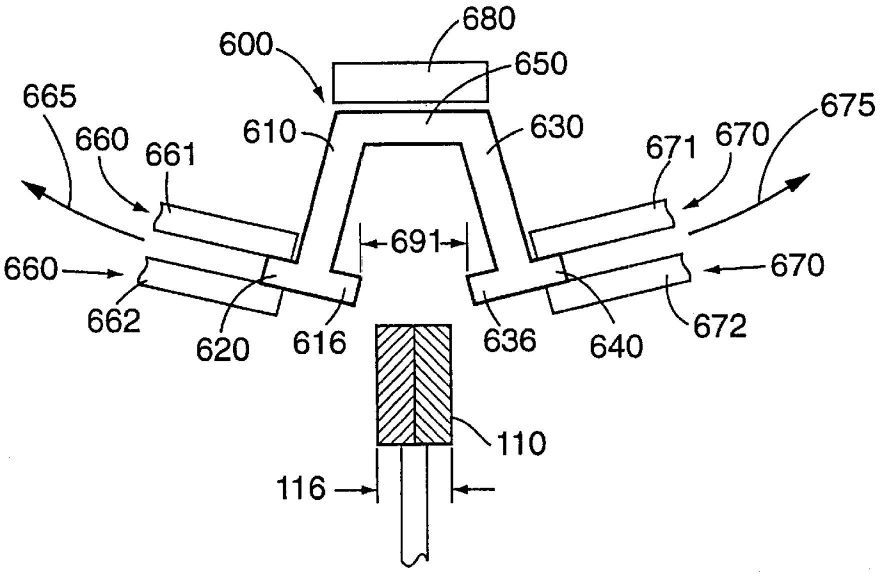

Next, the first tool 660 is moved away from the second tool 670, as shown, for example, in FIG. 31, to resiliently spread apart the side walls 610, 630 of the slider member 600. More specifically, the primary and secondary segments 661, 662 of the first tool 660 are moved away from the primary and secondary segments 671, 672 of the second tool 670 until the shoulders 616, 636 of the side walls 610, 630 are separated by a gap 691 which is large enough to freely receive the interlocking fastening strips 110 therebetween and is greater than or equal to the width 116 of the fastening strips 110. While the first tool 660 may be moved away the second tool 670 in a variety of ways to resiliently spread apart the side walls 610, 630 of the slider member 600, in the illustrated embodiment the primary and secondary segments 661, 662, 671, 672 of the first and second tools 660, 670 are moved away from each other in a generally arcuate manner as indicated by arrows 665, 675 in FIG. 31.

A third tool 680 may be positioned directly above and proximate to the intermediate body portion 650 of the slider member 600, as shown, for example, in FIGS. 29–34 to prevent or obstruct inadvertent disengagement between the side walls 610, 630 and the tools 660, 670 as the side walls 610, 630 are being spread apart.

Once the side walls 610, 630 of the slider member 600 have been spread apart a sufficient amount, the interlocking fastening strips 110 are inserted between the spread apart side walls 610, 630 by moving the fastening strips 110, the slider member 600, or both relative to each other. For example, the fastening strips 110 are moved upwardly as indicated by arrow 676 between the spread apart side walls 610, 630, as shown, for example, in FIG. 32, to insert the fastening strips 110 therebetween. This upward movement of the interlocking fastening strips 110 should continue until the fastening strips 110 are positioned substantially between the intermediate body portion 650 of the slider member 600 and the shoulders 616, 636 of the side walls 610, 630.

Figure 34:
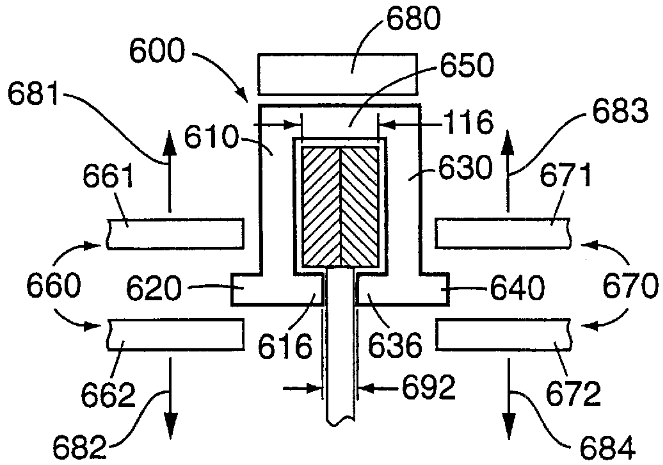

After the interlocking fastening strips 110 are received between the spread apart side walls 610, 630 of the slider member 600, the first and second tools 660, 670 are then released from engagement with the side walls 610, 630 of the slider member 600 to permit the side walls 610 and 630 to resiliently return to a relaxed or normal position, as shown, for example, in FIG. 34. In the relaxed position, the shoulders 616, 636 formed on the interior surfaces 615, 635 of the side walls 610, 630 are separated by a second gap 692, as shown, for example, in FIG. 34, which is smaller than the width 116 of the interlocking fastening strips 110. In this way, the shoulders 616, 636 are positioned to prevent or obstruct removal of the slider member 600 from the interlocking fastening strips 110 when the side walls 610, 630 are in the relaxed position. The interlocking fastening strips 110 are also entrapped between the shoulders 616, 636 of the side walls 610, 630 and the intermediate body portion 650 of the slider member 600.

The return of the side walls 610, 630 to the relaxed position may occur in two ways. In the first way, the primary and secondary segments 661, 662 of the first tool 660 are moved toward the primary and secondary segments 671, 672 of the second tool 670 in a generally arcuate manner, as shown, for example, by arrows 668, 678 in FIG. 33. Thereafter, the primary and secondary segments 661, 662, 671, 672 of the first and second tools 660, 670 are moved away from the ledges 620, 640 of the side walls 610, 630, as shown by arrows 681, 682, 683, 684 in FIG. 34, until the first and second tools 660, 670 become disengaged from the side walls 610, 630 of the slider member 600.

Figure 32:
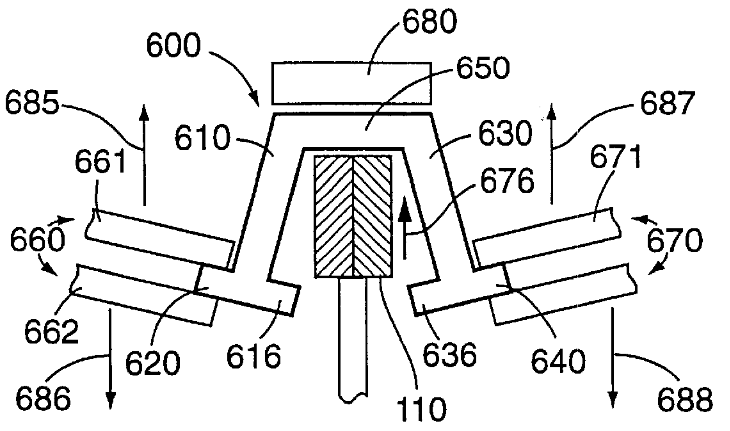
Figure 33:
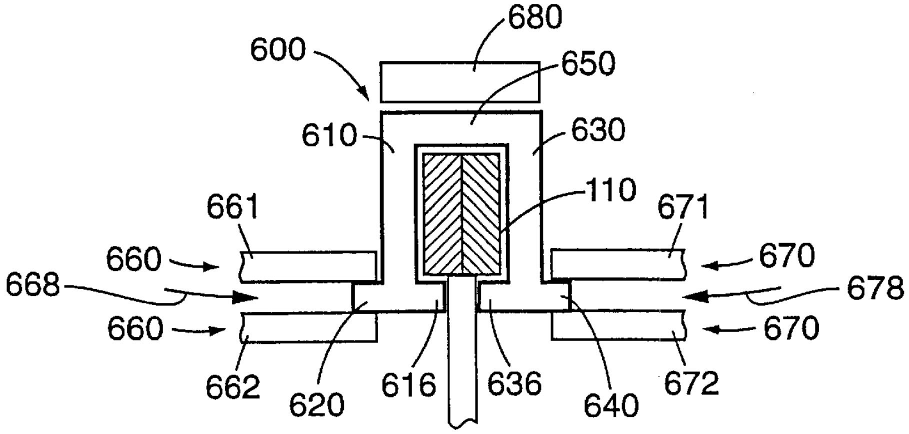

In the second way, the side walls 610, 630 may return to the relaxed position by disengaging the first tool 660 or the second tool 670 or both tools 660, 670 from the ledges 620, 640 (as indicated by arrows 685–688) when the slider 600 is in the position shown in FIG. 32. When the tools 660, 670 disengage, the side walls 610, 630 return to the position shown in FIG. 34 and the arcuate movement of the tools 660, 670 shown in FIG. 33 is not necessary.

Once the slider member 600 has been assembled onto the interlocking fastening strips 110 in this manner, it may be manually slid therealong to either close or open the fastening strips 110. The intermediate body portion 650 of the slider member 600 is positioned above the interlocking fastening strips 110, and the side walls 610, 630 of the slider member 600 are positioned on opposite sides of the interlocking fastening strips 110.

As will be readily appreciated by those skilled in the art, each embodiment of the disclosed slider member may be provided with a separator finger which extends downwardly from the intermediate body portion thereof. Once the slider member has been assembled onto the interlocking fastening strips 110, this finger facilitates separation of the fastening strips 110 when the slider member is moved in the deocclusion direction.

The sixth embodiment of the slider member 700 is shown in FIGS. 35–39. As with the prior embodiments, the sixth embodiment of the slider member 700 includes a pair of spaced-apart side walls 710, 730 which are adapted to be positioned on opposite sides of the interlocking fastening strips 110, and an intermediate body portion 750 which is adapted to be positioned upon and installed above the interlocking fastening strips 110. More specifically, the intermediate body portion 750 is integrally connected to or combined with upper ends 711, 731 of the first and second side walls 710, 730, as shown, for example, in FIGS. 36–38. On account of this construction, the slider member 700 has a generally inverted U-shaped configuration when viewed from the front and rear as shown, for example, in FIG. 36.

Figure 36:
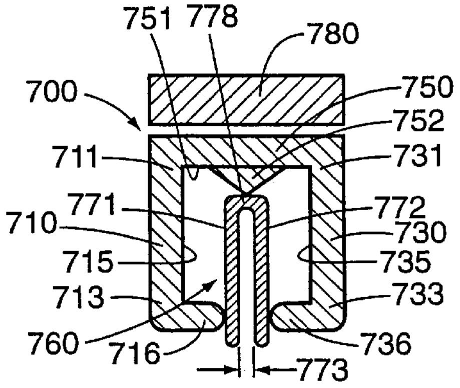
FIGS. 36, 37, and 38 are enlarged cross-sectional views taken along lines 36—36, 37—37, and 38—38 of FIG. 35, respectively.

As shown in FIG. 36, the side walls 710, 730 of the slider member 700 have interior surfaces 715, 735 with opposed inwardly projecting shoulders 716, 736 formed thereon. The slider member 700 is also provided with a separator finger 752 which is formed on an interior surface 751 of the intermediate body portion 750 and extends downwardly between the interior surfaces 715, 735 of the two side walls 710, 730.

Figure 35:
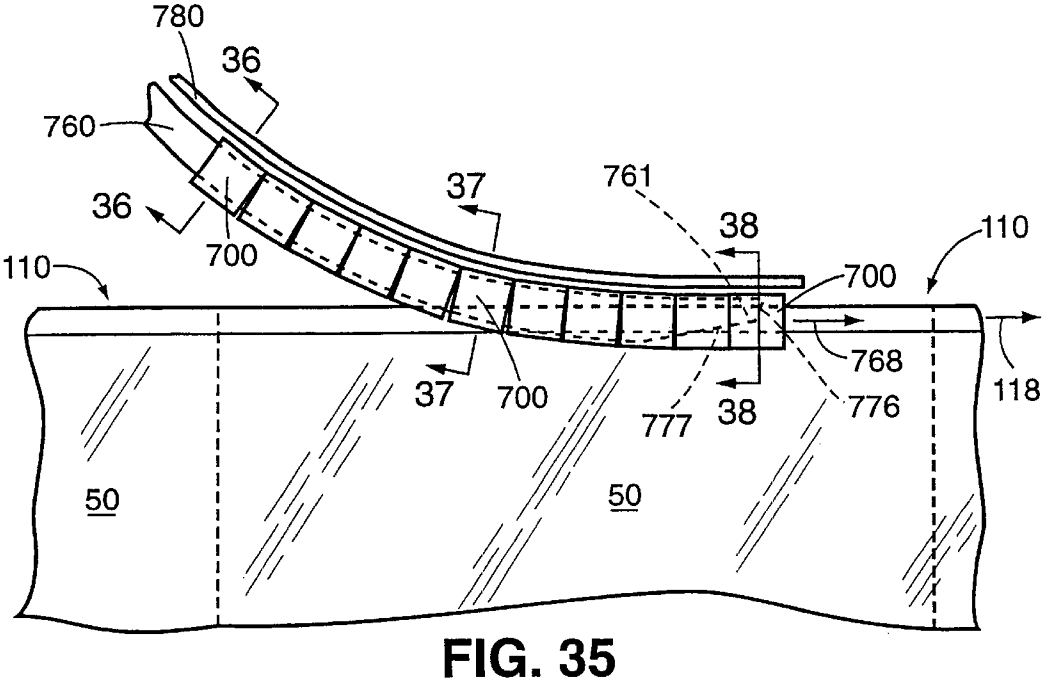
FIG. 35 is a side elevational view of a closure device, showing slider members in accordance with a sixth embodiment of the present invention being sequentially assembled onto interlocking fastening strips in accordance with a method of the present invention.
Figure 37:
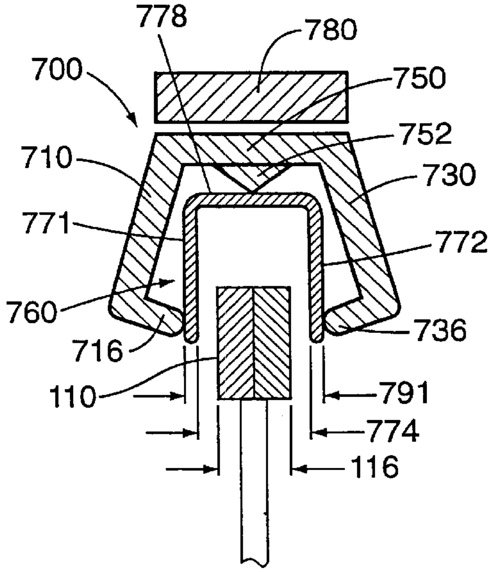
Figure 38:
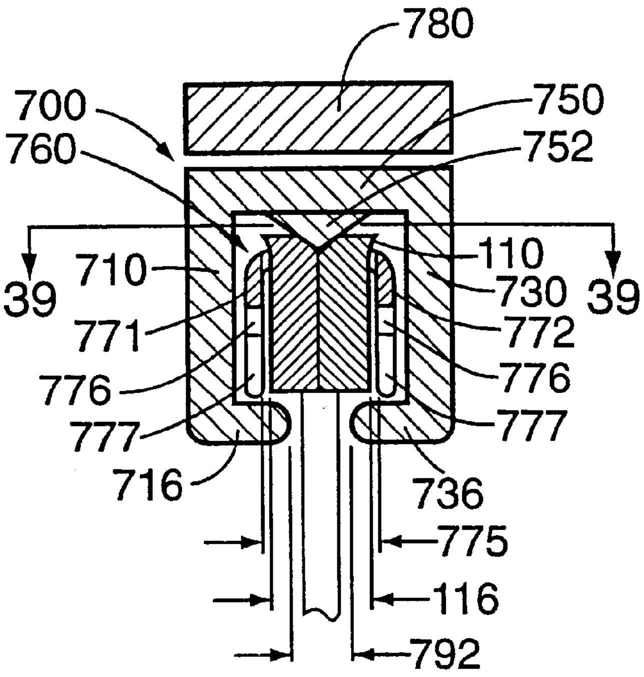

In order to assemble such slider members 700 onto interlocking fastening strips 110, a rail 760 is provided which, in the illustrated embodiment, is generally arcuate in configuration, as shown in FIG. 35, and converges with the interlocking fastening strips 110 at a distal end 761 thereof. As shown in FIGS. 36–38, the rail 760 includes opposed side portions 771, 772, which may be considered as first and second tools, and an intermediate top portion 778 therebetween. On account of this construction, the rail 760 has a generally inverted U-shaped configuration and cross-section which is adapted to be received between the opposed side walls 710, 730 of the slider member 700. As will be described more fully below, the side portions 771, 772 of the rail 760 are also separated by a distance 773, 774, 775 which varies along the length of the rail 760. In the illustrated embodiment, for example, the distance 774 between the side portions 771, 772 is relatively wide or large at an intermediate location, as shown in FIG. 37, the distance 775 is narrower or smaller at the distal end 761 of the rail 760, as shown in FIG. 38, and the distance 773 is narrowest or smallest at an upstream location, as shown in FIG. 36.

In keeping with an important aspect of the present invention, the slider members 700 may be conveniently assembled onto the interlocking fastening strips 110 in the following manner. To initiate the assembly process, a plurality of slider members 700 are arranged on the rail 760 such that each slider member 700 engages a portion of the rail 760. At the upstream location shown in FIG. 36, for example, the separator fingers 752 of the slider members 700 engage the top portion 778 of the rail 760 and the shoulders 716, 736 of the side walls 710, 730 engage respective side portions 771, 781 of the rail 760.

Once positioned on the rail 760, the slider members 700 are then moved, advanced, or pushed along the rail 760 toward the distal end 761 thereof, as indicated by reference numeral 768 in FIG. 35. At the same time, the interlocking fastening strips 110 are fed between the side portions 771, 772 of the arcuate rail 760 in a timed and automated manner, as indicated by reference numeral 118 in FIG. 35, such that one slider member 700 may be assembled onto a predetermined length of the interlocking fastening strips 110. The predetermined length may correspond to the length of one plastic bag. While the slider members 700 are shown in abutting relationship on the rail 760, those skilled in the art will appreciate that the slider members 700 may alternatively be spaced-apart along the length of the rail 760 depending upon the timing provided for assembling the slider members 700 onto the interlocking fastening strips 110.

As the slider members 700 are moved toward the distal end 761 of the rail 760, their side walls 710, 730 are resiliently spread apart to accept the interlocking fastening strips 110 therebetween. To this end, the distance between the side portions 771, 772 of the rail 760 is progressively widened as the rail 760 converges toward the interlocking fastening strips 110. In the illustrated embodiment, for example, the distance 774 between the side portions 771, 772 of the rail 760 is appreciably wider at the intermediate location shown in FIG. 37 than the distance 773 at the upstream location shown in FIG. 36. In operation, this progressive widening of the rail 760 causes the side walls 710, 730 of the moving slider members 700 to increasingly move apart until they reach a spread-apart position at or near the intermediate location of the rail 760, as shown, for example, in FIG. 37. In the spread-apart position, the distance 774 between the side portions 771, 772 of the rail 760 is large enough to freely receive the interlocking fastening strips 110 therebetween. In addition, the shoulders 716, 736 of the side walls 710, 730 are separated by a gap 791 which is large enough to receive the interlocking fastening strips 110 therebetween and is greater than or equal to the width 116 of the fastening strips 110.

A tool 780 may be positioned directly above and proximate to the intermediate body portions 750 of the slider members 700, as shown, for example, in FIGS. 36–38 to prevent or obstruct inadvertent disengagement of the side walls 710, 730 from the side portions 771, 772 of the rail 760 while the side walls 710, 730 of the slider members 700 are being spread apart. On account of this construction, the intermediate body portions 750 of the slider members 700 are positioned between the rail 760 and the tool 780. In addition, the tool 780 should have a generally arcuate configuration which is substantially similar to, but slightly smaller in radius, than the generally arcuate rail 760. The tool 780 should also extend between at least the upstream location of the rail 760 and the distal end 761 of the rail 760, as shown, for example, in FIG. 35.

As the slider members 700 are moved along the rail 760 from the intermediate location shown in FIG. 37 toward the distal end 761 thereof, the side walls 710, 730 of the slider members 700 are allowed to resiliently return to a relaxed or normal position, as shown in FIG. 38, in comparison to the spread-apart position shown in FIG. 37. In the relaxed position, the shoulders 716, 736 of the slider member 700 are positioned to prevent or obstruct removal of the slider member 700 from the interlocking fastening strips 110. To this end, the shoulders 716, 736 are separated by a second gap 792 which is smaller than the width 116 of the interlocking fastening strips 110, as shown in FIG. 38. In order to permit the side walls 710, 730 of the slider members 700 to resiliently return to their relaxed position, the distance between the side portions 771, 772 of the rail 760 progressively narrows from the relatively wide distance 774 at the intermediate location of the rail 760, as shown in FIG. 37, to the relatively narrow distance 775 at the distal end 761 of the rail 760, as shown in FIG. 38.

Thereafter, the slider members 700 are discharged from the distal end 761 of the rail 760 to assemble the slider members 700 onto the interlocking fastening strips 110. In particular, one slider member 700 is discharged from the distal end 761 of the arcuate rail 760 for a predetermined length of the interlocking fastening strips 110 that is fed between the side portions 771, 772 of the rail 760. In this way, a single slider member 700 is assembled onto a predetermined length of the interlocking fastening strips 110 in an automated and timed manner.

In order to permit the shoulders 716, 736 of the side walls 710, 730 to taper inwardly toward the relaxed position as the slider members 700 advance toward and are discharged from the distal end 761 of the rail 760, each side portion 771, 772 of the rail 760 may have one or more inclined edges 776, 777 at the distal end 761 thereof, as shown, for example, in FIG. 35. These inclined edges 776, 777 also cause a gradual reduction in the height of the rail 760 which permits the distal end 761 of the rail 760 to be received between the intermediate body portion 750 of the slider members 700 and the shoulders 716, 736 of the side walls 710, 730, as shown, for example, in FIG. 38.

Figure 39:
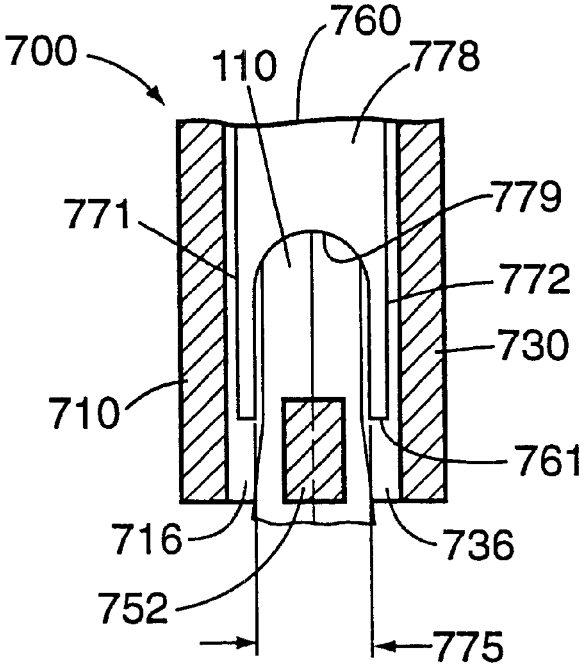
FIG. 39 is a fragmentary cross-sectional view taken along line 39—39 of FIG. 38.

As shown in FIG. 39, an opening 779 is formed in the intermediate top portion 778 of the rail 760 at the distal end 761. More specifically, this opening 779 substantially spans the distance 775 between the side portions 771, 772 of the rail 760 and extends inwardly from the distal end 761. In usage, this opening 779 permits the separator fingers 752 of the moving slider members 700 to be at least partially received between the interlocking fastening strips 110 as the slider members 700 are discharged from the distal end 761 of the rail 760.

Once the slider members 700 have been assembled onto the interlocking fastening strips 110 in this manner, they may be manually slid therealong to either separate or attach the fastening strips 110. The intermediate body portion 750 of the slider members 700 are positioned above the interlocking fastening strips 110, and the side walls 710, 730 of the slider members 700 are positioned on opposite sides of the interlocking fastening strips 110.

While several different slider member embodiments have been specifically described and illustrated herein, those skilled in the art will appreciate that these particular embodiments have been provided for illustrative purposes only and do not represent an exhaustive register of each and every slider member covered by the present invention. Indeed, other types, kinds, versions, and forms of slider members may alternatively be employed without departing from the scope or spirit of the present invention. Those skilled in the art will also appreciate that each embodiment of the slider member may be utilized with any type of interlocking fastening strips.

In order to provide sufficient resiliency to the slider members, each embodiment thereof may be formed from a suitable plastic material such as nylon, polypropylene, polystyrene, acetal, toughened acetal, polyketone, polybutylene, terephthalate, high density polyethylene, polycarbonate, ABS (acrylonitrile-butadiene-styrene), or the like. Each embodiment of the slider member may be colored, opaque, translucent or transparent.

The interlocking fastening strips may be manufactured by extrusion through a die. In addition, the fastening strips may be manufactured to have approximately uniform cross-sections. This not only simplifies the manufacturing of the closure device, but also contributes to the physical flexibility of the closure device, which may be a desirable property.

Generally, the interlocking fastening strips may be formed from any suitable thermoplastic material including, for example, polyethylene, polypropylene, nylon, or the like, or from a combination thereof. Thus, resins or mixtures of resins such as high density polyethylene, medium density polyethylene, and low density polyethylene may be employed to form the fastening strips. In most instances, the fastening strips are made from low density polyethylene. The selection of the appropriate thermoplastic material, however, is related to the particular design of the fastening strips, the Young's Modulus of the thermoplastic material, and the desired elasticity and flexibility of the strips.

When the interlocking fastening strips of the present invention are used in a sealable bag, the fastening strips and the films that form the side walls of the bag may be conveniently manufactured from heat sealable material. In this way, the bag may be economically formed by using an aforementioned thermoplastic material and by heat sealing the fastening strips to the bag. In most instances, the bag is made from a mixture of high pressure, low density polyethylene and linear, low density polyethylene.

The interlocking fastening strips may be manufactured by extrusion or other known methods. For example, the closure device may be manufactured as individual fastening strips for later attachment to the side walls of the bag or may be manufactured integrally therewith. In addition, the fastening strips may be manufactured with or without flange portions on one or both of the fastening strips depending upon the intended use of the closure device or expected additional manufacturing operations.

Generally, the closure device can be manufactured in a variety of forms to suit an intended use. In practicing the present invention, the closure device may be integrally formed on the opposing side walls of the container or bag, or connected to the container by way of any known method. For example, a thermoelectric device may be applied to a film in contact with the flange portion of the fastening strips or the thermoelectric device may be applied to a film in contact with the base portion of fastening strips having no flange portion, to cause a transfer of heat through the film to produce melting at the interface of the film and a flange portion or base portion of the fastening strips. Suitable thermoelectric devices include heated rotary discs, traveling heater bands, resistance-heated slide wires, and the like. The connection between the film and the fastening strips may also be established by the use of hot melt adhesives, hot jets of air to the interface, ultrasonic heating, or other known methods. The bonding of the fastening strips to the film stock may be carried out either before or after the film is U-folded to form the bag. In any event, such bonding is done prior to side sealing the bag at the edges by conventional thermal cutting. In addition, the first and second fastening strips may be positioned on opposite sides of the film. Such an embodiment would be suited for wrapping an object or a collection of objects such as wires. The first and second fastening strips should usually be positioned on the film in a generally parallel relationship with respect to each other, although this will depend on the intended use.

In summary, the present invention discloses several embodiments of resilient slider members and methods of assembling such slider members onto interlocking fastening strips. The slider members comprise a pair of spaced-apart side walls and an intermediate body portion therebetween. In addition, each side wall includes an interior surface with an inwardly projecting shoulder formed thereon, an exterior surface, and opposed end surfaces. The method of assembling such slider members onto interlocking fastening strips comprises the steps of: engaging respective side walls of a slider member with first and second tools; moving the first tool away from the second tool to resiliently spread apart the side walls of the slider member; inserting interlocking fastening strips between the spread apart side walls of the slider member; and releasing the first and second tools from engagement with the side walls of the slider member to permit the side walls to resiliently return to a relaxed position wherein the shoulders formed on the interior surfaces of the side walls are positioned to obstruct removal of the slider member from the interlocking fastening strips.

While the present invention has been described and disclosed in connection with certain illustrated embodiments, it will be understood, of course, that there is no intention to limit the invention to the disclosed structural forms. On the contrary, the intention is to cover to cover all modifications, alternative constructions, and equivalents that fall within the scope and spirit of the present invention as defined by the following claims. In addition, all references and co-pending applications cited herein are hereby incorporated by reference in their entireties.

What is claimed is:

1. A method of assembling resilient slider members onto interlocking fastening strips, the slider members each having a pair of spaced-apart side walls and an intermediate body portion therebetween, the method comprising the steps of:

arranging a slider member on a rail which converges with interlocking fastening strips at a distal end thereof;

moving the slider member along the rail toward the distal end thereof;

resiliently spreading apart the side walls of the slider member to accept the interlocking fastening strips therebetween as the slider member is moved along the rail toward the distal end thereof;

resiliently returning the spread apart side walls of the slider member to a relaxed position, the side walls are positioned to obstruct removal of the slider member from the interlocking fastening strips, as the slider member reaches the distal end of the rail;

discharging the slider member from the distal end of the rail to assemble the slider member onto the interlocking fastening strips.

2. The method set forth in claim 1, wherein the step of arranging a slider member on a rail which converges with interlocking fastening strips at a distal end thereof comprises:

positioning the slider member on a generally U-shaped rail such that the side walls of the slider member engage respective side portions of the generally U-shaped rail.

3. The method set forth in claim 2, wherein each side wall has a shoulder and the step of arranging the slider member on a generally U-shaped rail such that the side walls of the slider member engage respective side portions of the generally U-shaped rail comprises:

positioning the slider member on the generally U-shaped rail such that the shoulders of the slider member engage respective side portions of the generally U-shaped rail.

4. The method set forth in claim 1, wherein the step of resiliently spreading apart the side walls of the slider member comprises:

widening the distance between respective side portions of the rail to provide a gap between the side walls which is large enough to receive the interlocking fastening strips therebetween.

5. The method set forth in claim 4, wherein the step of widening the distance between respective side portions of the rail to provide a gap between the side walls comprises:

progressively widening the distance between the side portions of the rail as the rail converges toward the interlocking strips.

6. The method set forth in claim 1, wherein the step of resiliently returning the spread apart side walls of the slider member to a relaxed position as the slider member reaches the distal end of the rail comprises:

narrowing the distance between respective side portions of the rail to provide a gap between the side walls which is small enough to obstruct removal of the slider member from the interlocking fastening strips.

7. The method set forth in claim 1, further comprising the step of:

providing inclined edges at the distal end of the rail to permit the slider member to taper inwardly toward the relaxed position as the slider member is discharged from the distal end of the rail.

8. The method set forth in claim 1, further comprising the step of:

reducing the height of the rail at the distal end thereof to permit the rail to be received between the intermediate body portion and the side walls as the slider member is discharged from the distal end of the rail.

9. The method set forth in claim 1, further comprising the step of:

providing an opening in a top portion of the rail at the distal end thereof to permit a separator finger projecting downwardly from the intermediate body portion of the slider member to be at least partially received between the interlocking fastening strips as the slider member is discharged from the distal end of the rail.

10. The method set forth in claim 1, further comprising the step of:

providing a tool above the rail to obstruct the slider member from becoming disengaged with the rail as the side walls of the slider member are being resiliently spread apart.

11. The method set forth in claim 10, wherein the step of providing a tool above the rail to obstruct the slider member from becoming disengaged with the rail as the side walls of the slider member are resiliently spread apart comprises:

positioning the intermediate body portion of the slider member between the rail and the tool.

12. An apparatus for assembling resilient slider members onto interlocking fastening strips, the slider members each having a pair of spaced-apart side walls and an intermediate body portion therebetween, the apparatus comprising:

a rail for a slider member which converges with interlocking fastening strips at a distal end thereof;

the apparatus moves the slider member along the rail toward the distal end thereof;

the apparatus spreads apart the side walls of the slider member to accept the interlocking fastening strips therebetween as the slider member is moved along the rail toward the distal end thereof;

the apparatus returns the spread apart side walls of the slider member to a relaxed position, the side walls are positioned to obstruct removal of the slider member from the interlocking fastening strips, as the slider member reaches the distal end of the rail; and the apparatus discharges the slider member from the distal end of the rail to assemble the slider member onto the interlocking fastening strips.

13. The invention set forth in claim 12, wherein the rail is generally U-shaped and the side walls of the slider member engage respective side portions of the generally U-shaped rail.

14. The invention set forth in claim 13, wherein each side wall has a shoulder and the shoulders of the slider member engage respective side portions of the generally U-shaped rail.

15. The invention set forth in claim 12, wherein the distance between respective side portions of the rail widens to provide a gap between the side walls which is large enough to receive the interlocking fastening strips therebetween.

16. The invention set forth in claim 15, wherein the distance between the side portions of the rail progressively widens as the rail converges toward the interlocking strips.

17. The invention set forth in claim 12, wherein the distance between respective side portions of the rail narrows to provide a gap between the side walls which is small enough to obstruct removal of the slider member from the interlocking fastening strips.

18. The invention set forth in claim 12, wherein the distal end of the rail includes inclined edges to permit the slider member to taper inwardly toward the relaxed position as the slider member is discharged from the distal end of the rail.

19. The invention set forth in claim 12, wherein the height of the rail at the distal end reduces to permit the rail to be received between the intermediate body portion and the side walls as the slider member is discharged from the distal end of the rail.

20. The invention set forth in claim 12, wherein the rail at the distal end has an opening in the top portion to permit a separator finger projecting downwardly from the intermediate body portion of the slider member to be at least partially received between the interlocking fastening strips as the slider member is discharged from the distal end of the rail.

21. The invention set forth in claim 12, further comprising a tool above the rail to obstruct the slider member from becoming disengaged with the rail as the side walls of the slider member are being resiliently spread apart.

22. The invention set forth in claim 21, wherein the intermediate body portion of the slider member is positioned between the rail and the tool.

* * * * *